US012737740B2

(12) United States Patent
Hoeschen et al.

(10) Patent No.: US 12,737,740 B2
(45) Date of Patent: Sep. 15, 2026

(54) SELF-SERVICE TERMINAL AND METHOD

(71) Applicant: Wincor Nixdorf International GmbH, Paderborn (DE)

(72) Inventors: Hermann Hoeschen, Paderborn (DE); Alex Fast, Paderborn (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 48 days.

(21) Appl. No.: 18/122,666

(22) Filed: Mar. 16, 2023

(65) Prior Publication Data

US 2023/0297986 A1 Sep. 21, 2023

(30) Foreign Application Priority Data

Mar. 18, 2022 (EP) .................................... 22162910

(51) Int. Cl.
*G06Q 20/18* (2012.01)
*G06Q 20/10* (2012.01)

(52) U.S. Cl.
CPC ......... *G06Q 20/18* (2013.01); *G06Q 20/1085* (2013.01)

(58) Field of Classification Search
CPC .. G06Q 20/18; G06Q 20/204; G06Q 20/3223; G06Q 10/083; G06Q 10/0836;
(Continued)

(56) References Cited

U.S. PATENT DOCUMENTS 6,326,934 B1 * 12/2001 Kinzie ...................... G07F 9/02 340/4.1
7,258,269 B1 * 8/2007 Block ................... G07F 19/205 235/379
(Continued)

FOREIGN PATENT DOCUMENTS

DE 102008060702 A1 * 6/2010 ............. G07F 19/20
DE 102014224676 A1 * 6/2016 ........... G07F 19/201
(Continued)

OTHER PUBLICATIONS

Craig Keefner, "ADA Kiosk Accessibility and Self-Service", Apr. 15, 2019, Kiosk Industry, https://kioskindustry.org/self-service-ada/ (Year: 2019).*
(Continued)

*Primary Examiner* — Ashford S Hayles
(74) *Attorney, Agent, or Firm* — Black McCuskey

(57) ABSTRACT

A self-service terminal includes a user interface to provide information to a user of the self-service terminal, an interface modification button, and a control device configured to: determine, whether an interface interaction mode of the self-service terminal is a first interface interaction mode or a second interface interaction mode. The control device is also configured to instruct, in response to a user input at the interface modification button, a modification of: a first perceptible property assigned to the information, when the interface interaction mode is the first interface interaction mode, and a second perceptible property assigned to the information, when the interface interaction mode is the second interface interaction mode.

17 Claims, 9 Drawing Sheets

(58) Field of Classification Search
CPC ........... G06Q 20/3274; G06Q 30/0601; G06Q 50/12; G07D 11/00; G07F 9/001; G07F 9/002; G07F 19/20
See application file for complete search history.

(56) References Cited

U.S. PATENT DOCUMENTS

| | | | | |
|---|---|---|---|---|
| 7,494,050 | B1 * | 2/2009 | Bowen | G06Q 20/105 705/45 |
| 7,644,039 | B1 * | 1/2010 | Magee | G07F 19/20 235/382 |
| 8,723,941 | B1 * | 5/2014 | Shirbabadi | G07F 19/205 348/78 |
| 8,783,566 | B1 * | 7/2014 | Drew | G16H 40/20 235/382 |
| 9,766,846 | B1 * | 9/2017 | Theobald | G06F 1/1613 |
| 9,858,558 | B1 * | 1/2018 | Cardinal | G07F 19/204 |
| 10,146,423 | B1 | 12/2018 | Reed | |
| 10,339,508 | B1 * | 7/2019 | Wurmfeld | G06Q 20/1085 |
| 10,347,091 | B1 * | 7/2019 | Bailey | G07F 19/205 |
| 2003/0093473 | A1 * | 5/2003 | Hara | G06F 16/9577 707/E17.121 |
| 2005/0015254 | A1 * | 1/2005 | Beaman | G06F 3/0482 704/E15.044 |
| 2006/0038004 | A1 * | 2/2006 | Rielly | G06Q 30/0207 235/379 |
| 2006/0218063 | A1 * | 9/2006 | Vogt | G06Q 40/04 705/35 |
| 2007/0150364 | A1 * | 6/2007 | Monaghan | G06Q 10/10 705/26.1 |
| 2009/0289104 | A1 * | 11/2009 | Yoneda | G06F 1/16 235/375 |
| 2012/0293642 | A1 * | 11/2012 | Berini | G06V 40/197 348/77 |
| 2013/0071817 | A1 * | 3/2013 | White | G09B 21/003 434/113 |
| 2014/0022160 | A1 * | 1/2014 | Velamuri | G06F 3/017 345/156 |
| 2014/0331131 | A1 * | 11/2014 | DeSellem | G07F 9/009 715/708 |
| 2014/0331189 | A1 * | 11/2014 | Lee | G07F 19/205 715/863 |
| 2016/0162856 | A1 * | 6/2016 | Johnson | G07F 19/206 705/43 |
| 2017/0017263 | A1 * | 1/2017 | Birgeoglu | G07G 1/0018 |
| 2017/0140600 | A1 * | 5/2017 | Halsey, Jr. | G06K 19/077 |
| 2017/0185980 | A1 * | 6/2017 | Wurmfeld | G06Q 20/1085 |
| 2018/0108076 | A1 * | 4/2018 | Tu | G06F 3/0482 |
| 2020/0048035 | A1 * | 2/2020 | Dayasagar | B66B 1/468 |
| 2020/0341624 | A1 * | 10/2020 | Gervais | G06F 3/165 |
| 2021/0081937 | A1 * | 3/2021 | Yaqub | G06Q 20/40145 |
| 2022/0035479 | A1 * | 2/2022 | Lasater | G06F 3/016 |
| 2022/0058601 | A1 * | 2/2022 | Yaqub | G06Q 20/3829 |
| 2022/0197431 | A1 * | 6/2022 | Lasater | G06F 3/016 |
| 2022/0221970 | A1 * | 7/2022 | Baer | G06F 3/0486 |
| 2023/0105790 | A1 * | 4/2023 | Shaw | G06F 3/0418 345/173 |
| 2023/0119154 | A1 * | 4/2023 | Weis | G06F 3/011 715/727 |

FOREIGN PATENT DOCUMENTS

| | | | | | |
|---|---|---|---|---|---|
| GB | 2352313 | A | * | 1/2001 | G09B 21/00 |
| JP | H0991495 | A | * | 4/1997 | |
| WO | WO-9827533 | A2 | * | 6/1998 | G09B 21/006 |
| WO | WO-0169380 | A2 | * | 9/2001 | H04L 12/2814 |

OTHER PUBLICATIONS

Thatcher, A., Mahlangu, S., & Zimmerman, C. (2006). Accessibility of ATMS for the functionally illiterate through icon-based interfaces. Behaviour & Information Technology, 25(1), 65-81. https://doi.org/10.1080/01449290500102128 (Year: 2006).*

Extended European Search Report filed in the corresponding European application dated Sep. 15, 2022; 9 pages.

* cited by examiner

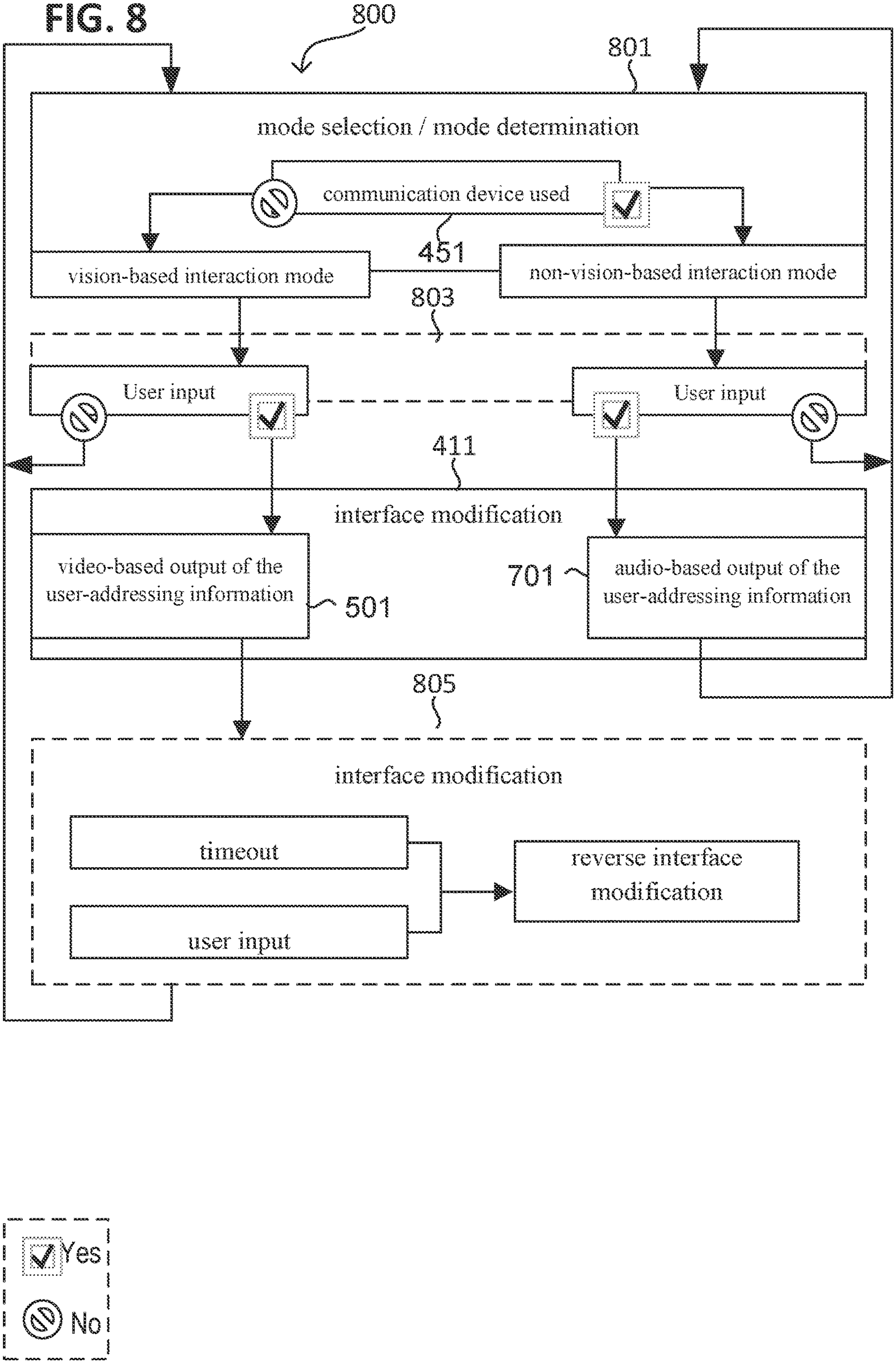

801 mode selection / mode determination communication device used

451 vision-based interaction mode non-vision-based interaction mode

803

User input

User input

411 interface modification video-based output of the user-addressing information

501

701 audio-based output of the user-addressing information

805 interface modification timeout user input reverse interface modification

SELF-SERVICE TERMINAL AND METHOD

CROSS-REFERENCE TO RELATED APPLICATIONS

This application claims priority to and the benefit of European Patent Application No. 22162910.8, filed 18 Mar. 2022, the contents of which are hereby incorporated by reference in their entirety.

TECHNICAL FIELD

Various aspects relate generally to self-service terminals and related methods.

BACKGROUND

Traditionally, a wide variety of services is offered via so called self-service terminals. As a general concept, the self-service terminal enables the user to request and complete the service autonomously, e.g., without human assistance.

As example, in traditional retail markets, a self-checkout terminal provides the possibility for a customer to scan the desired products by himself (e.g., unassisted) as an alternative to scan the products by a cashier. Such a self-checkout terminal provides for a faster checkout, more anonymity for the customer and less personnel costs for the retail market. By a self-checkout terminal, each customer, rather than the cashier, scans the bar codes of the products to be purchased. Another example is an automated teller machine.

A general challenge of such services is that the hardware of the self-service terminal, by which the user operates the self-service terminal, has to fulfill multiple criterions to be suitable. One of the criterions includes that the operation concept should be as intuitive as possible. Another of the criterions includes that the interaction should be as convenient and/or ergonomic as possible. However, minimizing the costs of the hardware is another criterion. Put together, conventional hardware is optimized to fulfill the criterions at best for the maximum possible group of persons, e.g., potential customers. Naturally, the resulting configuration fails to fit best for all persons. For example, some persons, such as children or wheelchair users, may be not able to access the full extent of hardware, which is optimized for a standing adult. Conventional concepts that address this gap are cost intensive, not intuitive, and normally directed to only one access problem.

SUMMARY

This relates more particularly to a self-service terminal and method.

In at least one embodiment the self-service terminal includes a user interface to provide information to a user of the self-service terminal, an interface modification button, and a control device configured to determine, whether an interface interaction mode of the self-service terminal is a first interface interaction mode or a second interface interaction mode, and instruct, in response to a user input at the interface modification button, a modification of a first perceptible property assigned to the information, when the interface interaction mode is the first interface interaction mode, and a second perceptible property assigned to the information, when the interface interaction mode is the second interface interaction mode.

The first perceptible property and the second perceptible property may differ from each other in the perceptual sense, to which they are perceptible.

The first perceptible property may be a video property, preferably a graphical position.

The control device may be configured to instruct the modification of the first perceptible property to an Application Programming Interface (API) of the self-service terminal.

The modification of the first perceptible property may include mirroring at least one operation element of a graphical output of the user interface, which represents the information. The mirroring may include to overlay the graphical output with a rearranged duplication of the at least one operation element.

The self-service terminal may be configured as automated teller machine (ATM).

The second perceptible property may be an audio property. The audio property may be audio volume.

The self-service terminal may further include a connection device, wherein the control device is configured to determine the second interface interaction mode as interface interaction mode, in response to the connection device being in usage by the user, and preferably otherwise, determine the first interface interaction mode as interface interaction mode; and preferably, the user interface is configured to implement an audio user interface by the connection device.

The connection device may be configured to exchange an audio signal with a further connection device, when being coupled to each other. The control device may be further configured to determine the first interface interaction mode as interface interaction mode, in response to the usage of the connection device ended.

The control device may be further configured to initiate a financial transaction based on an input at the user interface, which is requested by the information.

The control device may be further configured, preferably when the interface interaction mode is the first interface interaction mode, to instruct a reversal of the modification of the first perceptible property, in response to a user touch input at the user interface, when a time stamp of the modification of the of the first perceptible property fulfills a predefined criterion, in response to a further user input at the interface modification button.

The modification may include a modification of a first parameter controlling the first perceptible property, when the interface interaction mode is the first interface interaction mode.

The modification may include a modification of a second parameter controlling the second perceptible property, when the interface interaction mode is the second interface interaction mode.

The modification of the first parameter may induces a change from a value of the first perceptible property prior to the user input at the interface modification button to a different value of the first perceptible property. The modification of the second parameter may induces a change from a value of the second perceptible property prior to the user input at the interface modification button to a different value of the second perceptible property.

The information may be invariant to the modification of the first perceptible property and/or of the second perceptible property.

The modification of the first perceptible property may be in accordance with a stored parameter. The modification of the first perceptible property may change a value of the first perceptible property to the stored parameter.

A method includes providing an information to a user of a self-service terminal by a user interface of the self-service terminal, determining, whether an interface interaction mode of the self-service terminal is a first interface interaction mode or a second interface interaction mode, instructing, in response to a user input at an interface modification button of the self-service terminal, a modification of a first perceptible property assigned to the information, when the interface interaction mode is the first interface interaction mode, and second perceptible property assigned to the information, when the interface interaction mode is the second interface interaction mode.

A computer-readable medium may include instructions, which, when executed by one or more processors, cause the processors to perform the method.

A controlling device may including one or more processors configured to perform the method.

A computer program may include instructions, which, when executed by one or more processors, cause the processors to perform the method.

Various aspects will become apparent to those skilled in the art from the following detailed description and the accompanying drawings.

BRIEF DESCRIPTION OF THE DRAWINGS

FIG. 8 is flow diagram, similar to FIG. 4, showing a method according to various other aspects.

Figure 1:
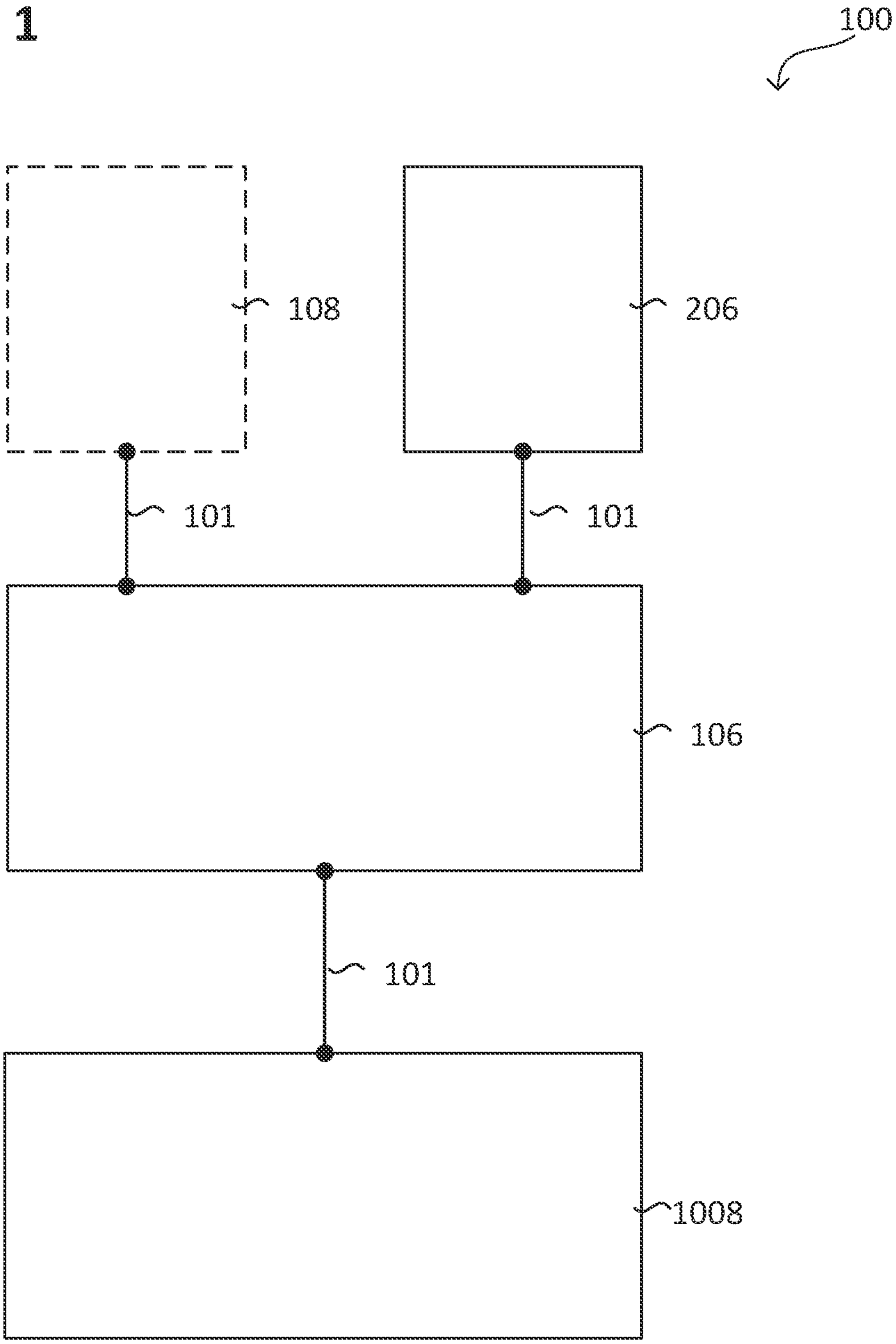
FIG. 1 is a schematic diagram of a self-service terminal according to various aspects.

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings.

DETAILED DESCRIPTION

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects may be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures.

The present disclosure relates to various functions (e.g., sequences). The functions may be implemented by hardware components and/or may be embodied in computer-readable instructions (such as software), which may be used to cause a general purpose or special purpose processor or other logic circuits programmed with the instructions to perform the functions.

The term "processor" as, for example, used herein may be understood as any kind of entity that allows handling data, signals, as examples. The data, signals, as example, may be handled according to one or more specific functions executed by the processor. A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), as examples, or any combination thereof. Any other kind of implementation of the respective functions, which will be described below in further detail, may also be understood as a processor or logic circuit. It is understood that any two (or more) of the processors or logic circuits detailed herein may be realized as a single entity with equivalent functionality, and conversely that any single processor or logic circuit detailed herein may be realized as two (or more) separate entities with equivalent functionality. It is understood that one or more of the method steps detailed herein may be performed (e.g., realized) by a processor, may by one or more specific functions executed by the processor.

The term "control device" (also referred as to controller) may be understood as any kind of a logic implementing entity, which may be special purpose circuitry or a processor executing software stored in a memory, firmware, or any combination thereof. Thus, a "control device" may include a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "control device" may, additionally or alternatively, include one or more processors executing software or at least code segments, e.g. any kind of computer program, e.g., a computer program using a virtual machine code such as e.g., Java.

According to various aspects, one or more functions implemented by one or more processors may, illustratively as counterpart, be realized by code segments stored in the memory, wherein, the code segments cause, if executed by the one or more processors, the one or more processors to perform the processes (e.g., functions and methods). The code segments, e.g., provided as part of the software, may be updated via a (e.g., mobile) network, e.g., on demand.

References made to a condition for a process or function, e.g., using terms like "if" and "when", may, for example, include that the process or function is carried out in response to the condition (e.g., being triggered by the condition).

The control device may be configured to control one or more components of the self-service terminal, e.g., by instructing the one or more components. The process of instructing may include generating an instruction (e.g., as message) and transmitting the instruction to the component to be controlled. The control device may optionally include a memory, e.g., storing code segments that represent the functions implemented by the control device, e.g., the controlling of the one or more operating functions. Additionally or alternatively, the memory may store one or more criterion, rules, and algorithms, as examples, as detailed herein.

As used herein, "memory" is understood as a computer-readable medium (e.g., a non-transitory computer-readable medium) in which information may be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate,", "send," "output," and other similar terms encompass both physical transmission (e.g., the transmission of signals, e.g., electrical currents) and logical transmission (e.g., the transmission of digital data over a logical software-level connection). For example, a processor or controller may transmit or receive data over a software-level connection with another processor or controller in the form of signals, where the physical transmission and reception is handled by signal transmission layer components such as transceivers, and the logical transmission and reception over the software-level connection is performed by the processors or controllers. The term "communicate" encompasses one or both of transmitting and receiving, i.e., unidirectional or bidirectional communication in one or both of the incoming and outgoing directions.

The transmission of information (information transmission), e.g., for instructing, may be in accordance with a (e.g., network) communication protocol. Generally, the transmission of information may include generating and/or sending a message including the information (e.g., instructions) in accordance with the communication protocol. The communication protocol may indicate an agreement according to which the information is transmitted between two or more components. In the simplest form, the communication protocol may be defined as a set of rules that define the syntax, semantics and synchronization of the transmission. The communication protocol(s) used (e.g. one or more network protocols) may be (but need not to be) configured according to the OSI (Open System Interconnect) reference model. Any protocols can also be used in the respective protocol layers. For example, the transmission of information via a certain type of network may include generating and/or sending a message including the information according to a network communication protocol.

The term "information" as used herein may be understood to include information in any suitable (e.g., analog or digital) form. Examples of information may be provided as computer-readable information, transmitted by a (e.g., electric, electromagnetic, mechanic, optic, etc.) signal (e.g., sound or light), include or are user perceptible information (e.g., transmitted by acoustic waves or visible light), and the like. The term information, however, is not limited to the afore-mentioned examples and may take various forms and represent any information as understood in the art.

The term "user interface" (herein also referred to as UI) may be understood as any type of entity capable to interact with a user (herein also referred to as human-machine interaction), e.g., to provide control of a machine (e.g., the terminal) by a user, and feeding back information to the user. The user interface may include one or more layers, of which at least one layer (also referred to as a human interface device, user interface hardware, user interface device or simply interface device) interfaces the machine with physical input hardware sensing the input of the user (also referred to as user input) and physical output hardware (e.g., speaker and screen). The human interface device may interact with one or more human senses, as examples including: sense of touch (providing tactile perception), sense of vision (providing video perception), sense of hearing (providing audio perception), and the like. Other layers of the user interface may include a signal transmission layer, a data processing layer, e.g., processing data representing the user input or data representing information provided to the user, a controlling layer, a data interface layers and the like.

The term "interface interaction mode" may be understood herein as operation mode relating to the type of user perception used for a human-machine interaction, e.g., the interaction between a user and the self-service terminal, e.g., its UI. For example, depending on the user's perception capabilities, the human-machine interaction may be based on video (e.g., image) perception, based on audio (e.g., acoustic) perception, based on touch perception, such as haptic perception or tactual perception, or the like. Each interface interaction mode may correspond to one or more types of user perception used for the human-machine interaction, when the self-service terminal is in the interface interaction mode. Accordingly, examples of the interface interaction mode may include a video interaction mode (e.g., only video interaction mode), audio interaction mode (e.g., only audio interaction mode), non-video interaction mode (without vision), and the like. In the video user interaction mode, the information may be provided video-based (e.g., visible), wherein the user may respond per touch, voice, gesture, or the like. The same may apply to one or more other user interaction modes as referenced herein.

Different interface interaction modes differ from each other in at least one type of user perception used for the human-machine interaction. Accordingly, the self-service terminal, e.g., its UI, may be capable to appeal to the type of user perception, e.g., to the senses (herein also referred to as human sense or as perceptual sense) used for the type of user perception. For example, the self-service terminal, e.g., its UI, may, for each interface interaction mode, include at least one user interface device configured for an interaction with the user based on the type of user perception corresponding to the interface interaction mode. For example, the self-service terminal may include a video (e.g., graphical) user interface to implement the video interaction mode (e.g., vision-based interaction mode) and/or include an audio user interface to implement the audio interaction mode (e.g., voice-based interaction mode).

A video UI may include at least one display device (in other words one or more devices) as human interface device and a graphical UI providing data-based graphics (including symbols and other graphical elements, e.g., augmented by text), which are displayed by the at least one display device. The graphical UI may include multiple layers, among others: a client layer (e.g., including one or more clients), a display processing layer, and a display driver layer (e.g., implemented by the kernel). The display processing layer may include the display server layer and/or the graphical interface layer. The display processing layer connects client layer (e.g., a software application, also referred to as operational application) with the display driver layer. The display processing layer may receive data from one or more clients of the client layer, processes the data, transfers the data to the display driver layer (e.g., being a component of the kernel). The display driver layer writes the data into the framebuffer. The content of the framebuffer is transmitted to the connected display device.

The term "button" may be understood as one type of physical input hardware (e.g., implemented by a sensor), which is configured to sense the user input, e.g., by sensing a user interaction with the button. For example, the user interaction may include a force transferred by the user to the button, e.g., when the user presses the button. For example, the user interaction may include a physical contact with the user, e.g., when the user touches the button. Exemplary implementations of a button may include: a push-button, a touch-button, a soft button (also referred to as soft key, which is a screen-labeled function key), a switch, etc.

According to various aspects, a modification (e.g., reconfiguration) of the user interface may be triggered by a user input at an interface modification button. The modification of the user interface may modify one or more parameters representing a perceptible property of the output of the user interface. The type of perceptible property may be a function of the interface interaction mode. For example, the perceptible property may be modified by a modification of one or more video (e.g., visual) parameters, one or more audio (e.g., auditory) parameters, and/or one or more tactile parameters. For example, the perceptible property may be a property of one or more programmable interface components, such as soft keys or other graphical operation elements, acoustic output, and the like. A soft key is a button flexibly programmable to invoke any type of function rather than being associated with a single fixed function or a fixed set of functions. Examples of a soft key may include: a screen-labeled function key, a screen displayed function key (e.g., implemented via touch screen). As example, the perceptible property may be a visual property of the graphical output of the UI, or (e.g., in case of an audio parameter) may be represented by an electrical signal output by the UI, e.g., its amplitude or digitally encoded by the electrical signal.

As an example, changing the configuration of the user interface (also referred as modifying the user interface) may change a soft key (as example for a graphical interface component) in one or more of the following properties: a position (also referred as to rearranging), a size (also referred as to resized), a color, a brightness, and/or a label. For example, a user sitting in a wheelchair may be enabled to access all relevant soft keys by rearranging the relevant soft keys proximate the most bottom position of the user interface (e.g., the touch surface). The interface modification may change the configuration on the client layer, the display processing layer, and/or the display driver layer, e.g., a combination thereof. For example, the scaling of a graphical operation element may be defined by the client layer (e.g., within the running software application) and/or by the driver layer (e.g., defining the rendering scale).

Changing the interface interaction mode may facilitate the interaction of the user with the self-service terminal, e.g., dependent on the physiological condition of the user, e.g., dependent on a sensory condition, an anatomical condition, a motoric condition (e.g., motor skill), or a combination thereof. The physiological condition may be, but does not need to be, severe or permanent to be a disability. As an example, the physiological condition may reflect the physiological functional capacity (PFC) of the person, e.g., with respect to the task of operating the self-service terminal. In general, PFC refers to the ability to perform the physical tasks of daily life and the ease with which these tasks can be performed by the person. PFC may decline automatically with advancing age (even in healthy adults) and/or may decline with impairments occurring during the person's lifetime or present from birth of the person. It may be understood that the references made with respect of the physiological condition (also referred to as physiological condition) of the person (e.g., user of the self-service terminal) are not intended to assume a judgement of the physiological condition, but rather relate to the accessibility of the user interface of the self-service terminal. The interface interaction mode may be directed to fit best for a certain physiological condition or range of physiological conditions, e.g., a certain body height, visual and/or auditory functionality of the person. Any deviation therefrom may (but not necessarily) increase the difficulty of the interaction between the person and the user interface, e.g., the difficulty to operate the self-service terminal. For example, the operating elements should be within the reach of a wheelchair user, but it is becoming challenging or even impossible to comply with these user specific requirements due to the market demand for larger and larger touchscreens.

To address such a deviation, the user interface (UI) of the self-service terminal may be modifiable in a technical sense, e.g., in terms of size, type of interaction layer, arrangement of UI components, visibility of UI components, audio volume, and/or position of graphical UI components and the like. For example, the UI of the self-service terminal may be temporally configured to be accessible at best by a user in a sitting position or a blind person. The UI may be modified, when requested by the user by a user input at the interface modification button.

The term "self-service terminal" may be understood as any type of (e.g., stationary or mobile) physical, e.g., ground or wall mounted, terminal configured to perform a self-service session, which provides the user of the self-service terminal to perform (e.g., produce or employ) a service, e.g., independent of involvement of direct service employee. The self-service terminal may include a user interface to interact with the user and a processor to operate the user interface in accordance with the self-service session. The processor may be, as an example, configured to guide the user through the self-service session via the user interface, e.g., via dialogue, and/or to communicate with a terminal external data source dependent on the interaction with the user. The self-service terminal may optionally have access to a service database storing service information in accordance with the self-service session. For example, the service database may be, at least in part, stored at a memory of the self-service terminal and/or, at least in part, requested by the self-service terminal in accordance with a network communication protocol, e.g., from the external data source. In some embodiments, the self-service session includes an initialization process to start the self-service session. Examples of the initialization process may include a user identification (e.g., authentication) process requesting the user to self-identify and/or a service selection (e.g., authentication) process requesting the user to select one or more types of services from services offered by the self-service terminal. In some embodiments, the self-service terminal, e.g., its processor, may be configured to execute an operation system (e.g., Microsoft Windows) as basis for one or more applications that provide the self-service session. It may be noted, that such application may not necessarily be executed locally by the self-service terminal, but could also be cloud hosted and/or configured as web application.

In the following, reference is made to specific types of self-service terminals, such as an automated teller machine, which is not intended to be limiting. Exemplarily types of self-service terminals include: Automated Teller Machine (ATM), banking terminal, self-service vending machine (e.g., for snacks, alcohol, cigarettes and/or jewelry), self-checkout terminal, self-service gas station, self-service scale, self-service kiosk, self-information terminal (e.g., for providing user requested information, e.g., of a geological region, a travel destination or the like), a self-service kiosk and banking terminal, self-pumping terminal at a gas station, a self-ticket purchasing terminal on the Internet and a self-check-out terminal at a hotel and/or a slot machine. In general, a self-service terminal may be configured to provide a self-service session represented (e.g., guided) by the output of the UI. Examples of a self-service kiosk include an information terminal and a self-order terminal (for example, used in a self-service restaurant, and/or having access to an online shop). The references made to a specific type of self-service terminal may analogously apply to other types of the self-service terminal.

In an exemplary implementation of the self-service session, the user may register the products that the user wants to purchase, e.g. by scanning the products by product scanning device (e.g. a barcode scanner). Furthermore, the self-checkout terminal may include a (e.g. digital) cash register system (e.g. having a self-service cash register or a cashier workstation), which is configured to perform a payment process. The payment process may, for example, include that the user initiates a financial transaction to pay for the products to be purchased. The cash register system may include one or more of the following components of the user interface: a screen (e.g. a touch-sensitive screen, also referred to as touch screen), a printer (e.g. for printing an invoice and/or a label), a (e.g. programmable) cash register keyboard (may also be part of the touch-sensitive screen), a payment terminal for accepting a medium of financial transaction (e.g. cash or a debit card). The payment terminal may be, for example, an electronic payment terminal (also known as an EC terminal, "EC"—electronic cash, e.g. for reading a debit card and/or a credit card). For example, the self-checkout terminal may include a (e.g. digital) cash register system that is configured to perform one or more cash register processes, such as a registration session. For example, a registration session may include a calculation process, an inventory process, and/or a registration process.

According to various aspects, one or more of the following is provided:

- the graphical output application is repositioned down on the screen in response to a user input at the interface modification button of the self-service terminal (e.g., being a vending machine), which may also provide a blind user to control the audio volume (in this case also referred to as volume control button);
- facilitation to compliance with the Americans with Disabilities Act (ADA) without having to fundamentally change the system concept;
- pragmatic implementation of a graphical interface modification that is activated only when needed by the user and otherwise maintains the normal "look and feel" of the graphical user interface (e.g., an application);
- compatibility of various aspects to existing hardware, without the need of customizations and dependencies to the application;
- graphical interface modification may be implemented by a native function of the operation system (e.g., Windows, IOS or Android) of the self-service terminal, e.g., via a magnification API (Application Programming Interface);
- no proprietary mechanism has to be developed for implementation of various aspects;
- optimal user guidance by displaying a specific ADA-user interface including a timeout (which resets automatically);
- alternatively or additionally, after each click/touch of the UI, the UI may be conceivable to reset the image to have the application completely visible;
- user may activate and reset functions independently;
- an available button of the self-service terminal may be used to implement the interface modification button,
- the available button may be conventionally used to allow a blind user to change the audio volume, but is conventionally deactivated, when no headset is plugged in;
- when no headset (e.g., including headphones) are not plugged in the self-service terminal, the interface modification button may be used to reposition down the image (or a part thereof) displayed by the UI;
- a flexible configuration may be implemented to define how much the image is repositioned down;
- the interface modification may be adaptable, e.g., according to the height differences between the self-service terminal and the ground, e.g., street (floor difference).

In general, the modification of the user interface may be implemented by a software application executed by the self-service terminal, e.g., by the control device. Additionally or alternatively, the modification of the user interface may include scaling the image on the driver/platform level.

FIG. 1 illustrates a self-service terminal 100 (simply also referred to as "terminal") according to various aspects in a schematic diagram. The terminal 100 may include a user interface 1008. The user interface 1008 may include one or more of the following: a display device (e.g., including a touch screen), one or more microphones, one or more speakers, one or more audio connection devices, one or more physical keys (also referred to as buttons). The user interface 1008 may be configured to receive one or more inputs (e.g., information including instructions, approvals, and/or selections) by the user and/or present one or more outputs (e.g., information including prompts, processing results, options, and/or explanations) to the user. As such, the user interface 1008 may provide an interaction with the user, e.g., by mutually exchanging information.

The user interface 1008 (UI) may include, as components, of one or more interface devices, e.g., configured as input device and/or output device. Examples of the interface devices may include: one or more tactile interface devices (interacting via touch), one or more video interface devices (interacting via vision), and/or one or more audio interface devices (interacting via sound, e.g., voice), e.g., including the one or more audio connection devices. For example, the UI 1008 may be configured to implement one or more graphical user interfaces (also referred to as video UI or as GUI) by the one or more video interface devices. Each video interface device may be configured to display graphics, such as one or more graphical operation (e.g., input) elements. In analogy, the UI 1008 may be configured to implement a tactile UI configured to receive input from the user by touch and/or pressure. Additionally or alternatively, the tactile UI may implement an interaction via braille. Optionally, the video interface device may be combined with the tactile interface device to implement a visual/tactile UI 1008 (e.g., including a touch screen). In analogy, the UI 1008 may be configured to implement an audio UI configured to provide a voice interaction with the user, e.g., by audio output and/or audio input, by the one or more audio interface devices.

The terminal 100 may further include an interface modification button 206 (herein also referred to as IM-button). The IM-button 206 may be configured to sense an input by the user (also referred to as user input), e.g., by sensing the user interacting with the IM-button 206, e.g., by sensing the user pressing and/or touching the IM-button 206. As such, the IM-button 206 allows the user to interact with the terminal 100, in order to instruct an interface modification.

The terminal 100 may include a control device 106. The control device 106 may be coupled communicatively with the IM-button 206 and/or the user interface 1008. As such, the control device 106 may communicate with the IM-button 206 and/or the UI 1008. The communicative coupling 101 may include a network, e.g., a CAN-network, Ethernet network and/or a communication bus, e.g., Universal Serial Bus, or any other type of data transferring coupling. The information communicated to the control device 106 may be converted into data (also referred as to input data) for further processing by the control device 106. The information from the IM-button 206 may include sensor data that represents the user input sensed by the IM-button 206. The information from the user interface 1008 may include sensor data that represents an input of the user at the user interface 1008. The information communicated to the user interface 1008 may include instructions to output information and/or to modify the user interface 1008.

The control device 106, the user interface 1008, and/or the IM-button 206 may include a corresponding infrastructure (e.g. processor, storage medium and/or bus system) or the like, which implements a sensing and processing chain (SPC). The SPC may be configured to control the corresponding sensor(s), to process their sensed quantity as input and, based on this, to provide an output representing the result of the measurement.

The control device 106 may be configured to determine (also referred to as "mode determination"), whether an interface interaction mode of the terminal 100 (herein also referred to as actual interface interaction mode) is a first interface interaction mode or a second interface interaction mode. The first interface interaction mode may be, for example, a video interaction mode, e.g., being the default interaction mode, or another default interaction mode. The second interface interaction mode may be, for example, a non-video interaction mode, e.g., an audio interaction mode, e.g., an only audio interaction mode.

In an example, the mode determination may be based on an indicator (also referred to as mode indicator). The mode indicator may be a function of the actual interface interaction mode, or the actual interface interaction mode may be a function of the mode indicator. Examples of the mode indicator may include: a state of the terminal 100 (e.g., connection state), a user interacting with the terminal 100 (e.g., by), a perceptible (e.g., acoustic) signal from a user, an operation state of the UI 1008, and the like. The mode indicator is explained in more detail later.

Herein, reference is made to the video interaction mode and the non-video (e.g., audio-only) interaction mode for demonstrative purposes, which is not intended to be limiting. The references made to these modes may also apply to other types of modes, e.g., if more than two modes apply, and/or any other type of mode is used.

In one or more examples of the terminal 100, the terminal 100 may include one or more additional components 108 as outlined in the following.

In the example of the terminal 100 being a self-checkout terminal, the one or more additional components 108 may include a product scanning device 102 that is configured to scan one or more products. Illustratively, the product scanning device 102 may be operated by the user (also referred as to self-scanning procedure), e.g., by presenting a product to be scanned to the scanning device 102. Thereby, the user may register each desired product to be bought at the terminal 100. For example, the product scanning device 102 may sense a quantity of each product presented to the product scanning device 102. For example, the product scanning device 102 may include an optical scanning device, an RFID (radio-frequency identification) scanning device, or the like. The optical scanning device may, as example, include a barcode scanning device or an image scanning device. The barcode scanning device may include respective sensors to implement the scanning functionality, such as one or more infrared sensor, one or more cameras, and the like.

In operation, a product (e.g., a market product) may have an information medium to be scanned by the product scanning device 102, for example, such as a barcode and/or a RFID-tag. The information medium may include product information allocated to the product, e.g., by a product database. For example, the product information may represent a product identifier, a product type, or a product price.

In the example of the terminal 100 being an automatic teller machine (ATM) or the self-checkout terminal, the one or more additional components 108 may include a bank teller safe that is configured store or more monetary documents (also referred to as document storage), which may be received from the user or provided to the user. The bank teller safe may include a cavity for the document storage and a transfer device configured to transfer one or more monetary documents into the cavity and/or out of the cavity. The bank teller safe (e.g., its transfer device) may be configured to communicate with the control device 106. The communication between the bank teller safe and the control device 106 may be secured, e.g., by one or more cryptographic process.

Figure 2:
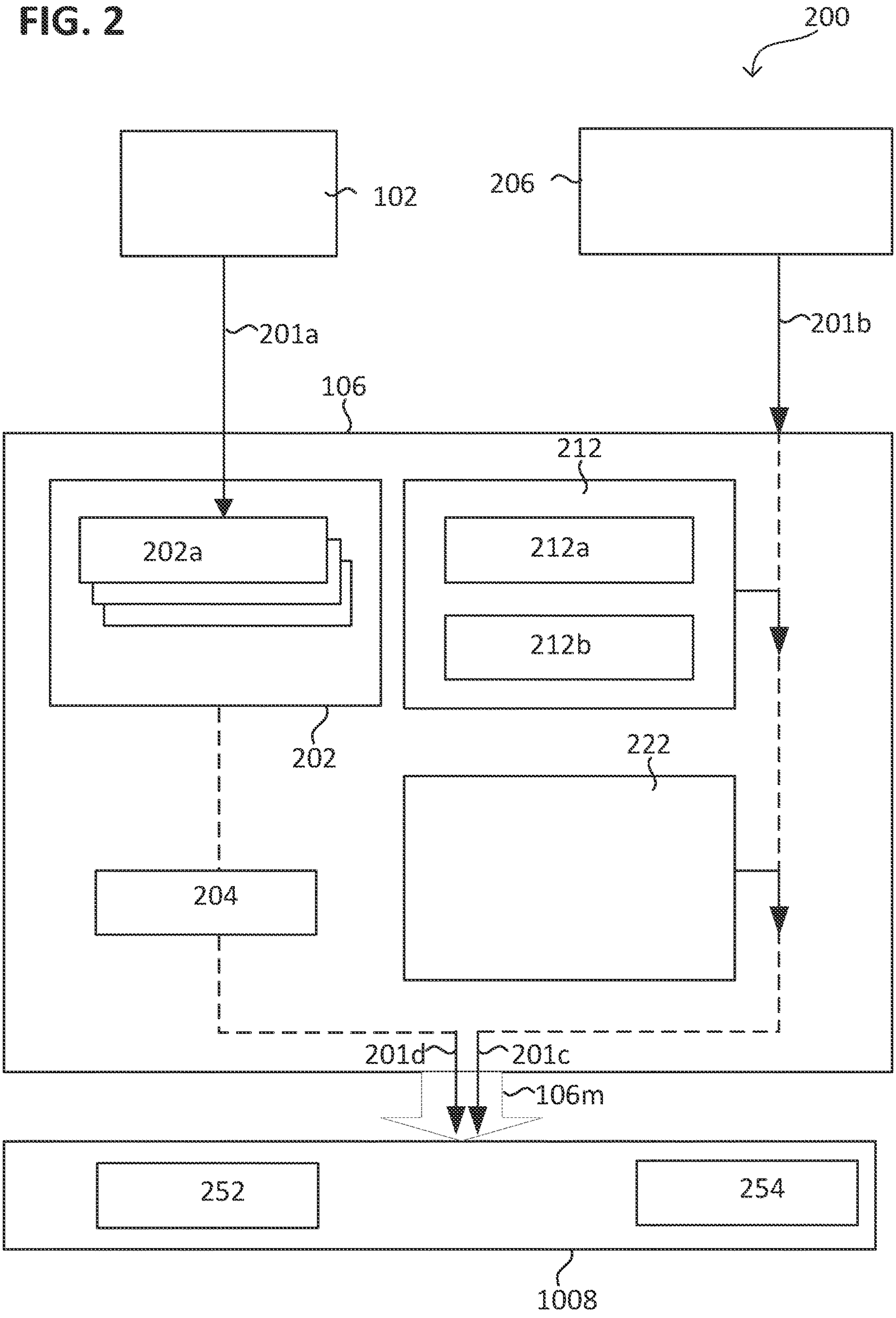
FIG. 2 is a schematic diagram, similar to FIG. 1, of another self-service terminal according to other various aspects.

FIG. 2 illustrates a terminal 100 according to various aspects 200 in a schematic diagram. The control device 106 may be configured to control (e.g., instruct) 201*c* the UI 1008 (also referred to as UI-control). The UI-control may include transmitting a control message 106*m* to the UI 1008. The control message 106*m* may include various information 201*d* addressing the user (also referred to as user-addressing information), which may be, but do not need to be, provided by the control device 106. In this context, the user-addressing information 204 refers to logical information (e.g., self-service session related information) for the user, such as, for example, linguistic (or at least text-based) information, cognitive information, dialog information, instructional information, and the like. Examples of the user-addressing information 204 may include: user control related information (e.g., an input request, an input graphic, e.g., a virtual keyboard or a virtual signing pad, a soft key), financial transaction related information (e.g., account information, monetary information, purchase information, payment information, cash withdrawal information, cash deposit information), or other self-service session related information (such as product information), and the like.

The control message 106*m* may include one or more instructions 201*c*, e.g., to instruct 201*c* a modification of the UI 1008 (in this case also referred to as modification instruction). The control device 106 may be configured to generate the modification instruction in response to a user input at the IM-button 206, e.g., in accordance with an (e.g., stored) interface modification profile 222 (herein also referred to as IR-profile) and/or based on the interface interaction mode 212. The IR-profile 222 may define one or more parameters (herein also referred to as modification parameters) of the UI 1008, which are changed by the interface modification, and/or the amount of the change. Optionally, the IR-profile 222 may be programmable, e.g., when the terminal 100 is set to a service mode.

The control device 106 may be configured to perform the mode determination 212, e.g., based on the mode indicator. As an example, the result of the mode determination 212 may be output or stored. The result of the mode determination 212 may include (e.g., indicate) the first interface interaction mode 212*a*, when the interface interaction mode (also referred to as actual interface interaction mode) of the terminal 100 is the first interface interaction mode 212*a* (herein also referred to as default case). The result of the mode determination 212 may include (e.g., indicate) the second interface interaction mode 212*b*, when the interface interaction mode (also referred to as actual interface interaction mode) of the terminal 100 is the second interface interaction mode 212*b*.

The control device 106 may be configured to determine the user input at the IM-button 206. As an example, the control device 106 may receive an electrical signal 201*b* from the IM-button 206 representing the user input.

The UI 1008 may be configured to convert the control message 106*m* into an output (also referred to as UI-output) as a function of the modification instruction and as a function of the user-addressing information 201*d*. According to various aspects, the UI-output may include or be the user-addressing information 201*d*.

For example, the UI 1008 may include an application (e.g., a GUI) converting the user-addressing information 201*d* into data representing a data-based (e.g., graphical) representation of the user-addressing information 201*d*. For example, the UI 1008 may include one or more device drivers converting the data-based representation into output data, such as video data, audio data, and the like.

For the implementation of one or more one or more interaction modes, the UI 1008 may include an interface device 252, which is configured to provide a UI-output being perceptible for the user (such as light, sound, braille, and the like), e.g., including one or more perceptible properties related to (e.g., representing) the user-addressing information 201*d*. Exemplary implementations of the interface device 252 may include a loudspeaker, a display device, a tactile keyboard, and the like. For example, the UI 1008 may include a screen (also referred to as display device) as interface device 252 to output the user-addressing information via the graphical representation presented by the screen. For example, the UI 1008 may include a loudspeaker (e.g., a bone conduction speaker or an air conduction speaker) as interface device 252 to output the user-addressing information 204 via an acoustic representation presented by the loudspeaker.

For example, the perceptible property may be a physical quantity, which is perceptible for the user. Examples of the perceptible property may include a visual property (a property visible to the user), an audio property (e.g., a property audible to the user), a tactile property (e.g., braille), and the like. Examples of the visual property may include a graphical position on the screen of the UI 1008, the brightness of the screen of the UI 1008, a contrast of the screen of the UI 1008. Examples of the audio property may include an audio volume (also referred to as audio output power or volume level), an audio speed, a language, and the like. For embodiments, in which the IM-button 206 triggers a volume change as modification of the second perceptible property, the IM-button 206 is also referred to as volume control button 206.

It may be understood that the UI 1008 may not necessarily be configured to provide a perceptible output for each interaction mode. For the implementation of one or more of such interaction modes, the UI 1008 may include a (e.g., audio) connection device 254 (e.g., an audio transmitter). The connection device 254 may be configured to implement an interface device, when coupled to user equipment (e.g., being a portable user device). Exemplary implementations of connection device 254 may include an audio jack, a Bluetooth transceiver, or the like. Exemplary implementations of the user equipment may include headphones, e.g., wireless headphones and/or wire-based headphones, or a bone conduction speaker. For example, the headphones may be part of a headset as user equipment.

For example, the connection device 254 may be configured to output an analog signal as UI-output, wherein a physical quantity (e.g., amplitude or electrical power) of the analog signal may represent the perceptible property (such as volume level), which is modified. For example, the connection device 254 may be configured to output a digital signal as UI-output (e.g., in accordance with a network communication protocol), wherein the digital signal includes a data-based representation of the perceptible property, such as encoded audio volume data. For example, the data-based representation of the perceptible property may indicate the volume level (herein also referred to as audio volume).

Further exemplarily implementations of the terminal 100, e.g., for providing a session are outlined in the following.

In an example, the control device 106 may be configured to receive an electrical signal 201*a* from the product scanning device 102 (if present) representing the product information of a product scanned by the product scanning device 102 (also referred as to scanned product). The control device 106 may be configured to determine purchase information 202*a* based on the product information (also referred to as registering a product). For each scanned product, the purchase information 202*a*, . . . , 202*n* may be determined and added to a list 202 of products.

The control device 106 may be further configured to determine payment information 204 (as user-addressing information) based on the purchase information (e.g., the list 202 of products), e.g., considering the number of products and/or the amount to be paid for each of the products. Illustratively, the payment information 204 may represent the total amount to be paid for the products as registered by the terminal 100.

For example, a product may have a product information medium to be scanned by the product scanning device 102, for example, such as a barcode and/or a RFID-tag. The product information medium may include product information allocated to the product, e.g., by a product database. Examples of the product information may represent a product identifier, a product type, or a product price. The control device 106 may interrogate a product database based on the product information and may determine the purchase information 202*a* based on the product database. Illustratively, a product database may include various information about products offered by the market. An exemplarily product database may allocate, for each of the products, the product identification to the purchase information. The product database may be stored by a storage medium (also referred to as database storage), e.g., internally of the terminal 100 or externally from the terminal 100.

The control device 106 may be configured to instruct the UI 1008 to output (e.g., display) the payment information 204 as user-addressing information 201*d*. For example, a graphical UI 1008 may be instructed to display the payment information 204. Additionally or alternatively, the control device 106 may be configured to instruct the UI 1008 to output purchase information 202*a* or the list 202 of registered products as user-addressing information.

In another example, the control device 106 may be configured perform a financial transaction as part of a session. Examples of the financial transaction may include: a payment of the registered products (in accordance with the payment information 204), a cash withdrawal, a cash deposit, a fund transfer (e.g., between two accounts). For example, when the terminal 100 is an ATM, the terminal 100 may be configured to implement one or more of the following functions (e.g., operable via the user interface): a cash withdrawal, a deposit, a fund transfer (e.g., between two accounts), and/or an account information inquiry; the ATM optionally including the bank teller safe (also referred to as strongbox).

In this example, the user-addressing information 201*d* may include information representing the financial transaction and/or the account information. Examples of the information representing the financial transaction may include: cash value, fund transfer direction, a request for a user credentials input, a request for a user account input, and the like.

The user-addressing information 201*d* may be output by the UI 1008 in accordance with the selected perceptible property. Additionally or alternatively, the user may interact with the UI 1008 being configured in accordance with the selected perceptible property.

Figure 3:
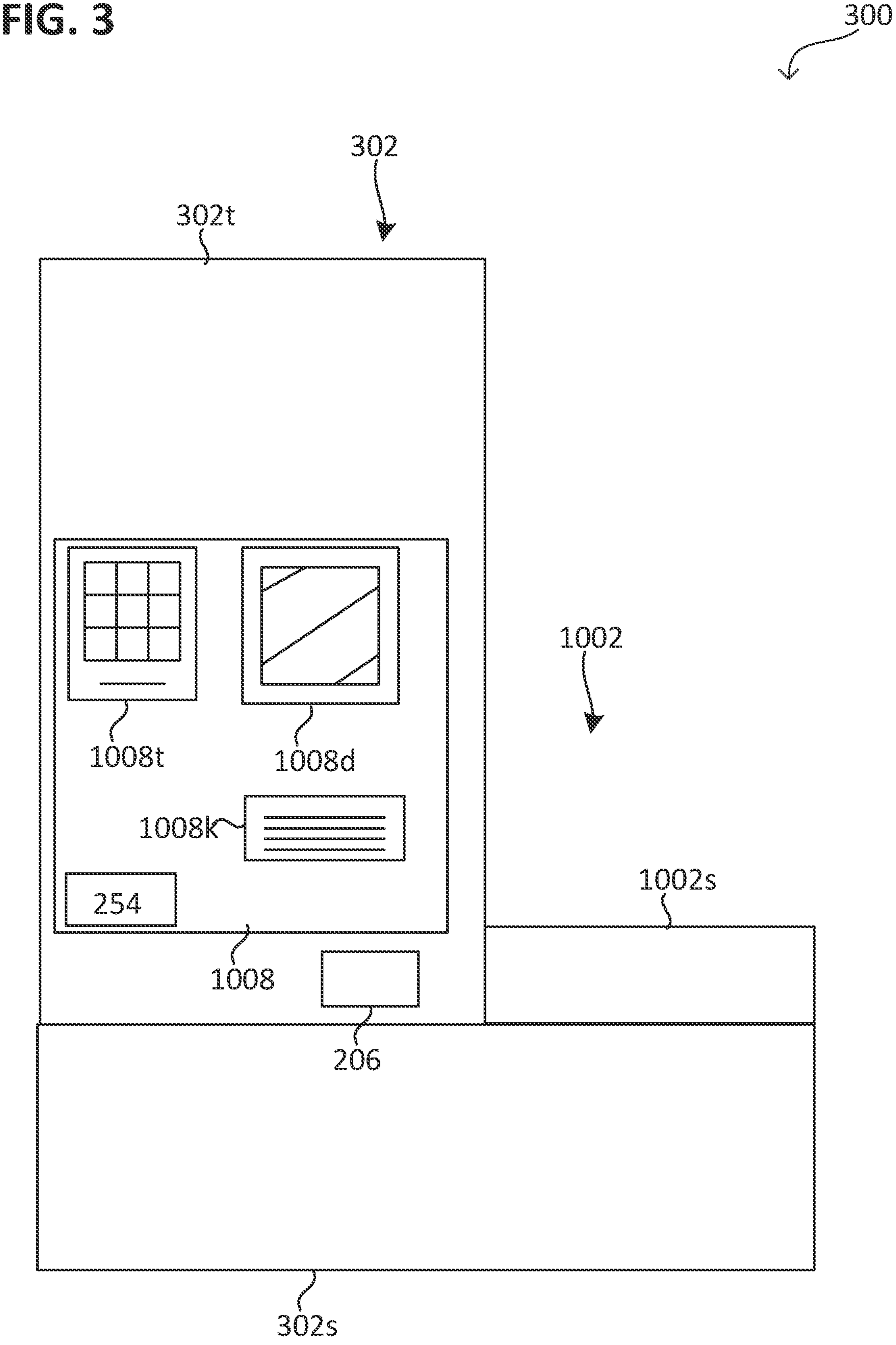
FIG. 3 is a schematic view of a self-service terminal according to further various aspects.

FIG. 3 illustrates a terminal 100 according to various aspects 300 in a schematic view, e.g., implementing a self-checkout terminal.

The terminal 100 may include a body 302, e.g., including a housing, a power plug, a stand 302*s* and the like. Certain (e.g., electronic) components of the terminal 100 may be hold by and/or attached to the body 302, for example, the product scanning device 102 (if present), one or more interface devices of the UI 1008 and/or the IM-button 206. For example, the UI 1008 and/or the IM-button 206 may be hold by and/or attached to a tower 302*t* of the body 302.

The UI 1008 may include at least one input device and/or at least one output device. The input device may be configured to receive a user input, e.g., one or more instructions of the user and/or one or more confirmations of the user. The output device may be configured to output a user perceptible information, e.g., acoustically and/or graphically (that is via audio and/or sound).

For example, the UI 1008 may include or be formed from a display device 1008*d* (e.g., including one or more screens) implementing the output device and optionally implementing the input device (e.g., via touch). For example, the user interface device 1008 may include a touch screen as input/output (I/O) device and/or one or more physical keys as input device, and/or a keyboard 1008*k* as input device. Optionally, the keyboard 1008*k* may be implemented by the touch screen of the display device 1008*d*. Alternatively or additionally, the UI 1008 may include an audio user interface, e.g., implemented by a connection device 254.

The UI 1008 may optionally include a financial transaction device 1008*t* (e.g., in case of a self-checkout terminal 100 or a banking terminal 100), that may be used for one or more financial transactions. For example, the financial transaction device 1008*t* may include a card reading device configured to receive a banking card and to read banking account information from the banking card. Additionally or alternatively, the card reading device may be configured to read banking account information via NFC, e.g., from a mobile device and/or the banking card.

The display device 1008*d* (e.g., its graphical user interface) may be configured to display information based on the interaction with the user (for example, self-checkout information, and/or financial transaction information). The self-checkout information may include a representation of the payment information, e.g., a (searchable or editable) virtual bill. The financial transaction information may include a representation of the financial transaction, e.g., an acknowledgement.

The financial transaction device 1008*t* may, for example, include at least one verification device configured to receive a verification input that associates the banking card with the user. Of course, other payment forms may be used additionally or alternatively to the banking card. Examples for a payment form may include a debit card, a debit account, a credit card, a credit account, or money.

Optionally, the financial transaction device 1008*t* may, for example, include other components that enable to conduct the financial transaction, e.g., a secure data interface for transmitting secured data regarding the financial transaction. For example, the secure data interface may communicate with a banking server.

Optionally, the financial transaction device 1008*t* may further include a printer of the UI 1008 to print a bill including a representation of the conducted financial transaction, e.g., details thereof and/or a summary thereof.

Optionally, the self-checkout terminal 100 (e.g., in case of a self-checkout terminal 100) may include a deposition area 1002. The deposition area 1002 may include a safety sensor device 1002*s* (also referred as to safety sensor device 1002*s*), which is used to monitor the self-scanning procedure performed by the user. Illustratively, the safety sensor device 1002*s* is used to detect fraudulent activity during the self-scanning procedure. For example, the safety sensor device 1002*s* may include a scale (also referred as to safety scale) or another type of sensor.

Figure 4:
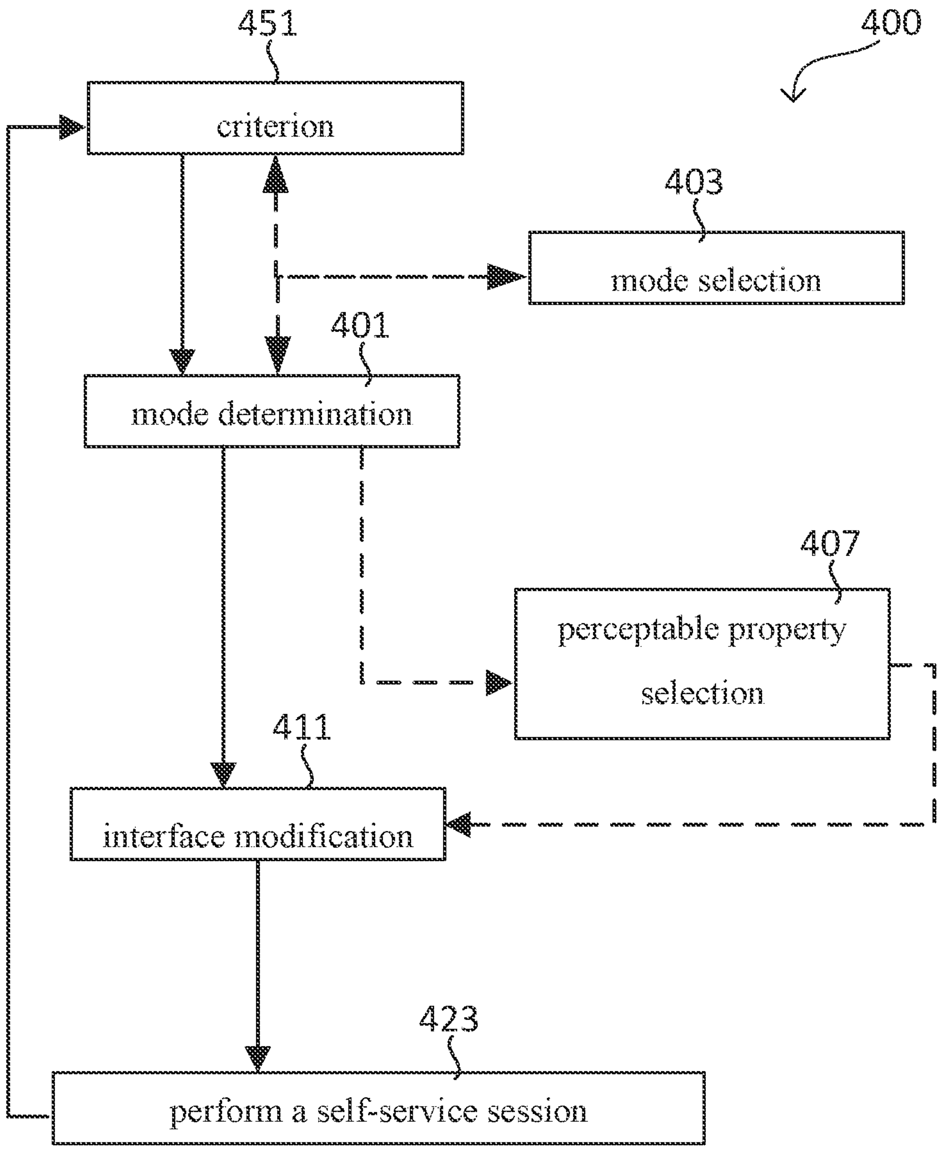
FIG. 4 is a flow diagram showing a method according to various aspects

FIG. 4 illustrates a method 400 in a schematic flow diagram for operating the self-checkout terminal 100 according to various aspects. The method 400 for operating the self-checkout terminal may, for example, be implemented by the control device 106. The interaction with the user (by exchange of information), e.g., receiving a user input and/or outputting (e.g., displaying) information to the user, as described in the following, may be performed by the UI 1008, e.g., one or more graphical output devices 1008*d* and/or one or more graphical input devices 1008*d* of the UI 1008.

Optionally, the method 400 includes to perform a self-service session 423, e.g., being initiated, continued, and/or ended in response to a user input, e.g., at the IM-button 206 and/or the UI 1008. Examples of the self-service session 423 may include: a self-checkout session, a self-scanning procedure, a self-banking session (e.g., at an ATM), self-retail session, and the like. The self-service session 423 may be permanently offered by the self-service terminal 100, e.g., via the UI 1008. An exemplarily self-checkout session may include: monitoring, if a product is scanned by the scanning device 102. Every time, a product is scanned by the scanning device 102, the purchase information 202*a* for the product is added to a product list based on the sensor data of the product scanning device 102. The exemplarily self-checkout session may further include: receiving an input representing a request to complete the self-checkout session (also referred as to ending request). When the ending request is received, the payment information 204 may be output and the financial transaction may be initiated by the user based on the payment information 204.

The method 400 may include, in 401, the mode determination. In an exemplarily implementation thereof, the mode determination 401 may be based on the mode indicator 451. For example, the mode indicator 451 may include a stored indication of the actual interface interaction mode. For example, the mode indicator 451 may include a usage status of the connection device 254. For example, the mode indicator 451 may include a user interaction with the self-service terminal 100, e.g., indicating the type of user perception, the user wishes to use for the interaction with the terminal 100.

The method 400 may include, in 403, selecting an interface interaction mode from a (e.g., stored) predefined plurality of interface interaction modes (also referred to as mode selection 403) as actual interface interaction mode. The mode determination 401 may, but not need to, include changing the interface interaction mode, e.g., by selecting an interface interaction mode that differs from the actual interface interaction mode. The mode determination 401 may, but not need to, be based on the mode indicator 451 and/or the result of the mode selection 403. In an example, the mode selection 403 may be triggered by a change of the usage status of the connection device 254 as mode indicator 451. In some embodiments, the mode determination 401 and the mode selection 403 may be implemented as the same process, e.g., automatically outputting the result of the mode selection 403 as result of the mode determination 401 (or vice versa) and/or being both based on the same mode indicator 451.

In an exemplarily implementation, the mode determination 401 and/or the mode selection 403 may include determining, whether the connection device 254 (e.g., an audio jack thereof or a Bluetooth connection) is under usage (represented by the usage status thereof) as mode indicator 451. The connection device 254 may be determined as being under usage when user equipment is plugged into the audio jack, when the Bluetooth connection is established between the connection device 254 and the user equipment, and/or when the UI-output is provided to the connection device 254, e.g., its audio jack. Illustratively, the usage status may represent an indication for the type of user perception, the user wishes to use for the interaction with the terminal 100, as mode indicator 451. For example, when a visually impaired (e.g., blind user) wishes to use a non-visual interaction mode, the user may connect audio user equipment (e.g., a portable user device) to the connection device 254, e.g., its audio jack. In response, the UI 1008 may be modified to provide the self-service session 423 via non-visual perception, e.g., via only-audio perception.

For example, the terminal 100 may be in the video interaction mode by default (in this case being the default interaction mode) or in another default interaction mode, when the usage status of the connection device 254, e.g., its audio jack, is not under usage (also referred to as unused). Additionally or alternatively, the terminal 100 may be in non-video interaction mode (e.g., an audio interaction mode, e.g., an only audio interaction mode), when the usage status of the connection device 254, e.g., its audio jack, is under usage (also referred to as "used").

The method 400 may include, in 411, an interface modification in response to a user input at the IM-button 206. The interface modification 411 may include modifying the UI 1008 or at least instructing a modification of the UI 1008. The modification of the UI 1008 may include a modification of one or more perceptible properties, e.g., as a function of the result of the mode determination 401. The perceptible property, which is modified by the interface modification 411 may change (see 407) in response to a change of the result of the mode determination 401.

The interface modification 411 may be of a first type, when the interface interaction mode is the first interface interaction mode, or a second type, when the interface interaction mode is the second interface interaction mode. The first type of interface modification 411 may include modifying (e.g., exclusively) at least one first perceptible (e.g., visible) property (e.g., a graphical position) related to the UI-output. The second type of interface modification 411 may include modifying (e.g., exclusively) at least one second perceptible (e.g., auditable) property (e.g., an audio volume) related to the UI-output.

According to various aspects, the UI-output may include or be the user-addressing information. Additionally or alternatively, the user-addressing information may be invariant regarding the interface modification 411. For example, the user-addressing information may be output twice (e.g., identically), e.g., before and after the interface modification 411. According to various aspects, the UI-output may, but do no need to, differ between the first type of interface modification 411 and the second type of interface modification 411.

As implementation example of method 400, the user-addressing information may include an audio-based guidance of the user through the self-service session, when the connection device 254 is under usage, e.g., when a connector is plugged into the audio jack, and/or when the interface interaction mode is the second interface interaction mode. The audio-based guidance may be transmitted by the connection device 254 to the user equipment, e.g., as (digital or analog) audio signal. In this case, the user input at the IM-button 206 may cause a change in audio volume (as perceptible property) of the audio-based guidance.

In the or another implementation example of method 400, the user-addressing information may include a video-based guidance of the user through the session, when the connection device 254 is not under usage, e.g., when no connector is plugged into the audio jack, and/or when the interface interaction mode is the first interface interaction mode. The video-based guidance may be provided by a screen of the UI 1008 to the user. In this case, the user input at the IM-button 206 may cause a change in position (as perceptible property) of the video-based guidance on the screen.

To facilitate the interface modification 411, the method 400 may optionally, in 407, include a selection of the perceptible property, e.g., based on the result of the mode determination 401. Then, the interface modification 411 may be configured, to only modify the selected perceptible property (and no other perceptible property).

Figure 5:
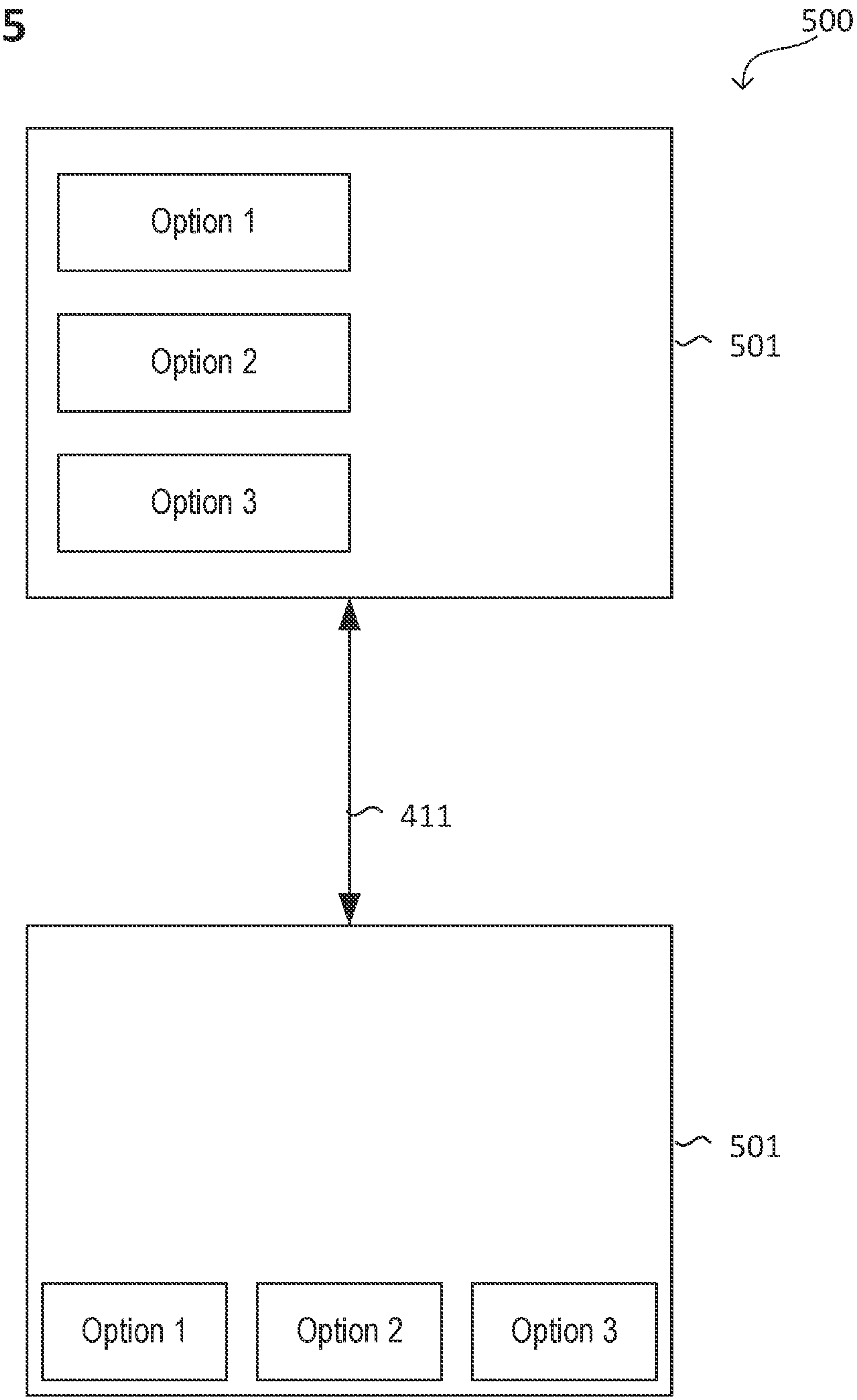
FIG. 5 is a schematic diagram showing interface modification according to various aspects.

FIG. 5 illustrates the interface modification 411 (e.g., its display device 1008*d*) according to various aspects 500 in a schematic diagram, in which the interface modification 411 includes a rearrangement (e.g., repositioning) of a graphical user interface 501 (herein also referred to as graphical interface modification) displayed by one or more touch screens of the UI 1008, when the interface interaction mode is the video interaction mode.

The graphical user interface 501 may present one or more graphical input (e.g., control) options (here option 1 to 3 as example) as operation elements, e.g., soft button or the like. Each of the graphical input options may, as user-addressing information, represent a certain option for operating the terminal 100, e.g., implementing a dialogue of the self-service session. The user may interact with the self-service terminal 100 by pressing and/or touching the touch screen at the position of the graphical input option, e.g., thereby selecting one of options 1 to 3.

In an exemplarily first scenario, the accessibility of the user is limited in height. For example, the user may be a young person, a growth-restricted person (also referred to as short stature) or in usage of a wheelchair. In this first scenario, to upper regions of the touch screen may be hard to reach for the user, e.g., thereby limiting access to graphical input options at the upper regions. However, the user may reach the IM-button 206, thereby triggering the interface modification 411.

As an example, the graphical interface modification may be performed on the client layer (e.g., including one or more clients), the display processing layer, and/or the display driver layer. Additionally or alternatively, the graphical interface modification may be configured to cause a modification of a video signal representing the graphical user interface of the UI 1008. The graphical interface modification may be configured to reposition one or more graphical input options, e.g., towards a lower region of the touch screen (e.g., without changing the operational function of the graphical input options). This rearrangement may facilitate the interaction with the self-service terminal 100 for the user of the first exemplarily scenario.

The rearrangement may be configured to change the positional coordinates as perceptible property of one or more graphical input options as exemplary graphical output (representing the user-addressing information) of the UI 1008. It may be understood that, additionally or alternatively to positional coordinates, one or more further perceptible properties of the graphical output may be changed by the graphical interface modification, such as, for example, size, shape, text size, contrast, hue, brightness, and the like.

Optionally, an input at the IM-button 206 may trigger the graphical interface modification, wherein a subsequent input at the IM-button 206 may reverse the graphical interface modification. This facilitates the operation of the self-service terminal 100.

Figure 6:
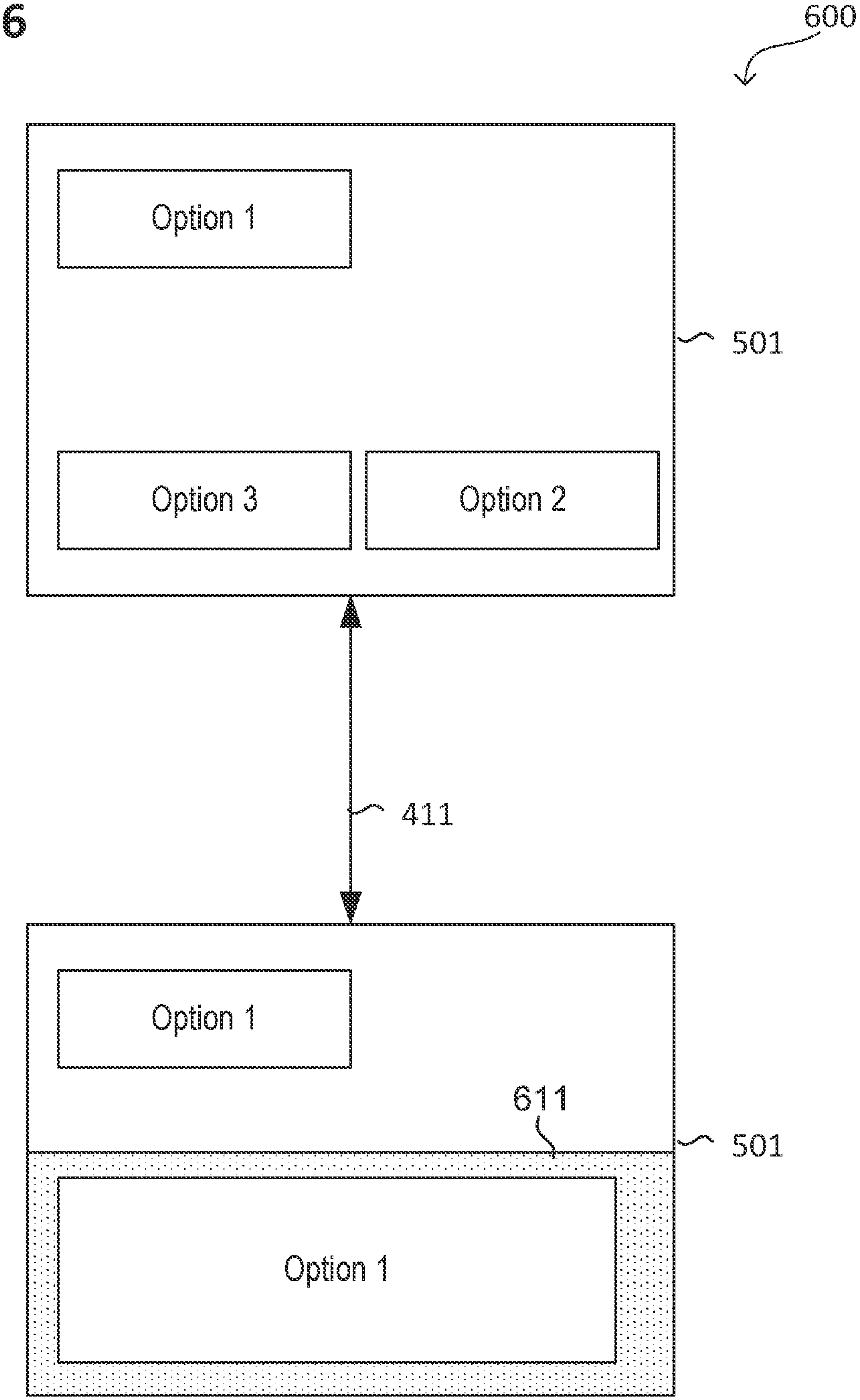
FIG. 6 is schematic diagram, similar to FIG. 5, showing interface modification according to further various aspects.

FIG. 6 illustrates the interface modification 411 according to various aspects 600 in a schematic diagram, similar to aspects 500, with the difference that the interface modification 411 includes mirroring a graphical output (representing the user-addressing information), e.g., one or more graphical input options of the graphical user interface. Mirroring may include a duplication (e.g., replication) of the graphical output (e.g., at least a part thereof) to another position on the screen (also referred to as duplicated graphical output). In some embodiments, mirroring includes to create an overlay 611 (herein also referred to as overlay graphic) to the current graphical user interface, wherein the overlay includes the duplicated graphical output (or another graphical output) of the graphical user interface, which is mirrored. FIG. 6 shows the exemplary at least one operation element that is illustrated as “Option 1” is displayed on the user interface duplicated, rearranged, and enlarged by modification 411, while also being displayed as it was displayed on the user interface prior to the modification 411.

Mirroring may be configured to change the positional coordinates as perceptible property of one or more graphical input options as exemplary graphical output (representing the user-addressing information) of the UI 1008. It may be understood that, additionally or alternatively to positional coordinates, one or more further perceptible properties of the duplicated graphical input option may be changed, such as, for example, size, shape, text size, contrast, hue, brightness, and the like. For example, the interface modification 411 may be configured to provide an enlarged graphical input option distributed evenly over the width of the display device **1008*d***, e.g., over its screen(s).

Parameters of the graphical interface modification, e.g., overlay size, graphical components to be mirrored, positional coordinates of the overlay, and the like, may be stored by the terminal 100, e.g., being programmable, e.g., when the terminal 100 is set to a service mode.

Optionally, an input at the IM-button 206 may trigger the graphical interface modification, wherein a subsequent input at the IM-button 206 may reverse the graphical interface modification. This facilitates the operation of the self-service terminal 100.

In an exemplarily implementation of the mirroring, the overlay may be created using an API, such as a magnification API. This facilitates the implementation, e.g., independently from the software and/or hardware architecture of the self-service terminal 100. The magnification API enables to apply a screen magnification applications running on Microsoft Windows. The magnification API supports two types of magnifiers, the full-screen magnifier and the magnifier control. The full-screen magnifier magnifies the content of the entire screen, while the magnifier control magnifies the content of a particular area of the screen and displays the content in a window (e.g., as overlay). For both magnifiers, images and text are magnified, and both enable to control the amount of magnification. The magnification API is initiated by calling a respective initialization function.

Figure 7:
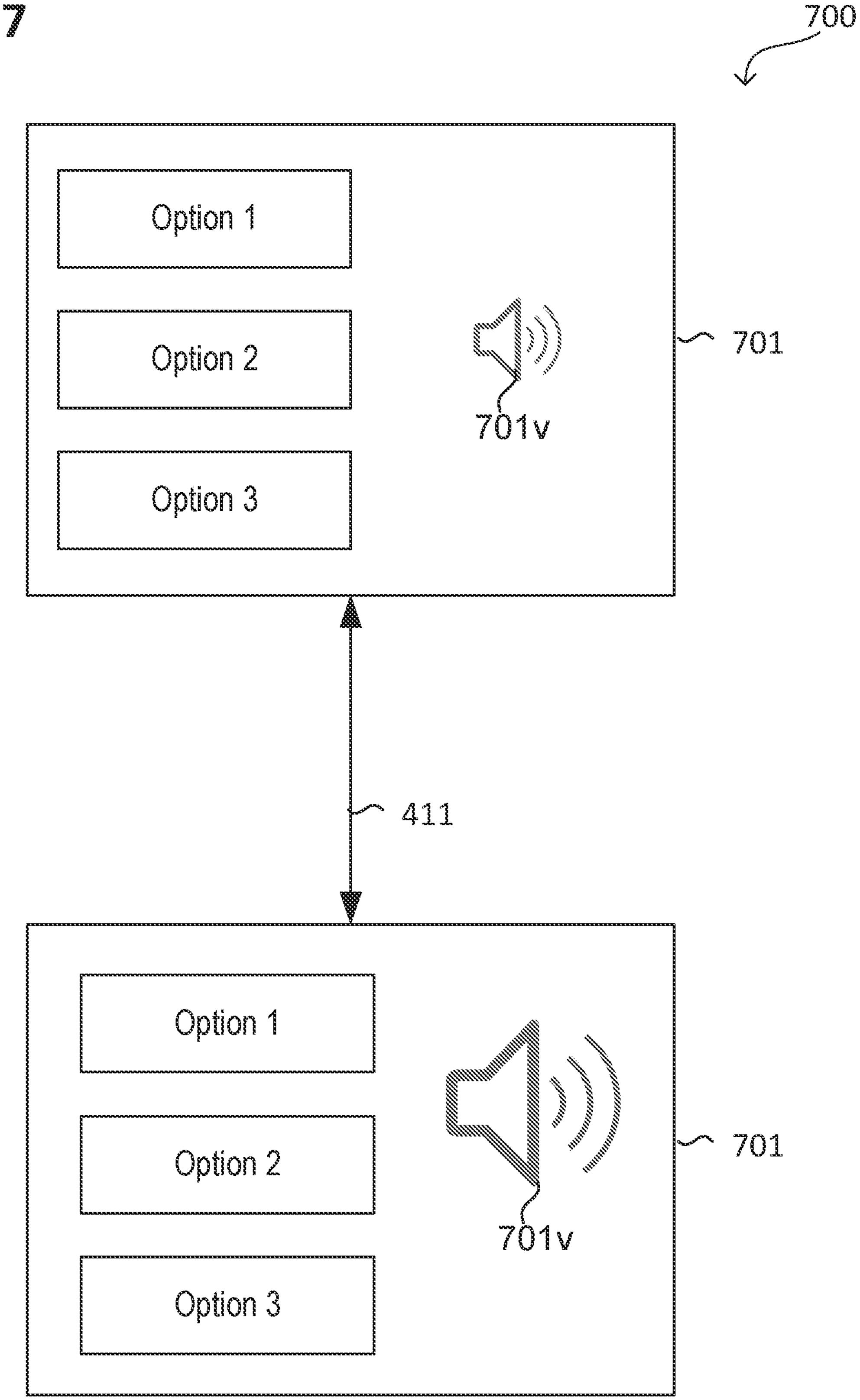
FIG. 7 is a schematic diagram, similar to FIG. 6, showing interface modification according to other further various aspects.

FIG. 7 illustrates the interface modification 411 (e.g., its connection device 254) according to various aspects 700 in a schematic diagram, similar to the above, with the difference that the interface modification includes a modification of an audio user interface 701 (in this case also referred to as audio interface modification). As example, the audio user interface 701 may be a voice user interface.

The audio user interface 701 may present various audio input options as operation elements (here option 1 to 3 as example), e.g., presented as voice input request or another voice output. Each of the audio input options may, as user-addressing information, represent a certain option for operating the terminal 100, e.g., implementing a dialogue of the self-service session. The user may interact with the self-service terminal 100 by voice, e.g., by naming the audio input option (thereby selecting one of options 1 to 3), but also by touch.

For example, the audio user interface 701 may be represented by an audio signal provided by the connection device 254, e.g., as analog audio signal or digital audio signal. The audio signal may be, in some embodiments, provided to the user equipment (e.g., including headphones), e.g., when the user equipment is coupled to the connection device 254. For example, the headphones may be part of a headset as user equipment.

The audio interface modification may, for example, change a volume level **701*v* of the audio signal 701 as perceptible property. In case of the digital audio signal 701, the volume level 701*v*** may be encoded in the digital signal.

In case of the analog audio signal 701, the volume level 701*v* may correspond to an electrical property of the audio signal 701, e.g., its amplitude.

In an exemplary implementation of the audio interface modification, the control device 106 may be configured to change (e.g., increase or decrease) the volume level 701*v* of the audio signal 701 in response to each user input at the IM-button 206 (herein also referred to as volume modification). The change (e.g., increase or decrease) of the volume level may be incrementally and/or within a range from a minimum level to a maximum level. In an exemplary implementation of the volume modification, the volume level may be set to the minimum level in response to the user input at the IM-button 206, when the volume level is at the maximum level and otherwise increased by a volume difference. This achieves a rotational volume change. In examples, the audio volume may change only between two values. Parameters of the audio interface modification, e.g., the minimum level, the maximum level and/or the volume difference (e.g., being positive or negative), and the like, may be stored by the terminal 100.

FIG. 8 illustrates a method 400 in a schematic flow diagram for operating the self-checkout terminal 100 according to various aspects 800, similar to the above, for the exemplary implementation using the usage state (e.g., coupling state) of the connection device 254 as mode indicator 451.

The method 400 includes, in 801, selecting and/or determining a non-default interaction mode (e.g., non-video interaction mode) as selected interaction mode, in response to determining the usage state of the connection device 254 being "used", e.g., "coupled to the user equipment", and otherwise selecting and/or determining the default interaction mode (e.g., video interaction mode) as selected interaction mode.

When the selected interaction mode is the non-default interaction mode (e.g., non-video interaction mode), the method 400 optionally includes instructing the UI 1008 to: deactivate a video output of the user-addressing information and/or the graphical user interface; and/or activate the audio output of the user-addressing information (e.g., by the connection device 254) or the voice user interface. When the selected interaction mode is the default interaction mode (e.g., video interaction mode), the method 400 optionally includes instructing the UI 1008 to: activate a video output of the user-addressing information and/or the graphical user interface; and/or deactivate the audio output of the user-addressing information (e.g., by the connection device 254) or the voice user interface. This increases security and facilitates the operation of the self-service terminal 100.

The method 400 includes, in 803, determining a user input at the IM-button 206 (herein also referred to as IR-request determination), and in 411, a first interface modification 411 in response to each user input at the IM-button 206. When no user input at the IM-button 206 is determined, the method 400 may return to 801.

The first interface modification 411 includes the audio interface modification, when the selected interaction mode is the non-default interaction mode (e.g., non-video interaction mode). For example, the audio interface modification may include a modification (e.g., change) of the volume level of the audio output of the user-addressing information (e.g., by the connection device 254).

The first interface modification 411 includes the video interface modification, when the selected interaction mode is the default interaction mode (e.g., video interaction mode). For example, the video interface modification may include a modification (e.g., change) of the position (also referred to as repositioning) of the video output of the user-addressing information (e.g., on the screen). The modification of the position may include mirroring video output of the user-addressing information, e.g., by an overlay.

Optionally, the method 400 includes, in 805, a second interface modification in response to the first interface modification, e.g., being the video interface modification, in response to an event (e.g., a reversal trigger event) and/or in response to a user input at the IM-button 206.

In a first implementation of the second interface modification, the second interface modification is configured to reverse the video interface modification (in this case also referred to as reversal interface modification). For example, the reversal interface modification may set the UI 1008 to the configuration (herein also referred to as start configuration), to which the video interface modification is applied.

In a second implementation of the second interface modification, the second interface modification is configured to proceed the first interface modification (in this case also referred to as proceeding interface modification). For example, the first interface modification and the proceeding interface modification may apply iterative changes to the UI 1008, e.g., towards a target configuration of the UI 1008. As example of the proceeding interface modification, a change of positional coordinates (e.g., by a number of pixel), that is instructed as first interface modification, may be instructed again as proceeding interface modification (e.g., by the or another number of pixel). As alternative or additional example of the proceeding interface modification, a change of a graphical magnification factor (e.g., implemented by the overlay), that is instructed as first interface modification, may be instructed again as proceeding interface modification (e.g., by the or another magnification factor). As further alternative or additional example of the proceeding interface modification, a scroll down activity (e.g., by a number of lines), that is instructed as first interface modification, may be instructed again as proceeding interface modification (e.g., by the or another number of lines). As further alternative or additional example of the proceeding interface modification, a change in audio volume (e.g., by a volume value), that is instructed as first interface modification, may be instructed again as proceeding interface modification (e.g., by the or another volume value).

In the first, the second or a third implementation of the second interface modification may be triggered by a user input at the IM-button 206, e.g., when the interface interaction mode of the self-service terminal is the first interface interaction mode or when the interface interaction mode of the self-service terminal is the second interface interaction mode. The reversal interface modification allows the user to react to an interface modification by accident. The proceeding interface modification allows the user amplify the changes made by the first interface modification, e.g., iteratively or at least stepwise.

In the first or a fourth implementation of the second interface modification, the second interface modification 805 may be triggered by a timeout as reversal trigger event, e.g., when the user fails to address the user-addressing information and/or without a user input (e.g., at the UI 1008 or the IM-button 206). In some alternative or additional embodiments, the second interface modification 805 may be triggered by a user input, e.g., at the UI 1008 or the IM-button 206, as reversal trigger event. For example, the second interface modification 805 may be triggered in response to a user input at the UI 1008 and/or in response to the timeout without the user input at the UI 1008. This allows a facilitated operation, e.g., as the UI 1008 is reset.

Further implementations of the reversal trigger event are outlined in the following.

In a first implementation, the reversal trigger event may include a chronological information, e.g., when the interface interaction mode is the first interface interaction mode and/or when the interface interaction mode is a video interface interaction mode. Examples of the chronological information may include the status of a timer and/or a time stamp of the first interface modification 411. For example, the timer may be started in response to an event (also referred to as timer starter). Examples of the timer starter may include: the user input (e.g., at the IM-button 206 and/or at the UI 1008), the first interface modification 411 (e.g., the first type or second type of the interface modification 411). For example, the video UI-output may be set to default, when the decreasing timer reaches zero or another value.

In the first implementation, the UI 1008 may optionally output the chronological information or another information representing the chronological information, e.g., a remaining time of the timer. For example, the UI 1008 may display the status of a decreasing timer and the interface interaction mode. Additionally or alternatively, the interface modification 411 may be triggered, when the decreasing timer reaches zero or another value (herein also referred to as timeout). In some configurations, the decreasing timer may be reset (to a default value) in response to a user input at the UI 1008.

In the first or a second implementation, the reversal trigger event may include the timer starter, e.g., the user input at the UI 1008, when the interface interaction mode is the first interface interaction mode and/or when the interface interaction mode is a video interface interaction mode (also referred to as vision-based interface interaction mode). For example, the video UI-output may be set to default, in response to a user input at the UI 1008.

In the first, second or a third implementation, the reversal trigger event may include a change in the usage status of the connection device 254, e.g., when the interface interaction mode is the second interface interaction mode and/or when the interface interaction mode is a non-video interface interaction mode. For example, the video based UI-output may be activated and/or the audio based UI-output deactivated, when a connector is plugged into the audio jack.

Figure 9:
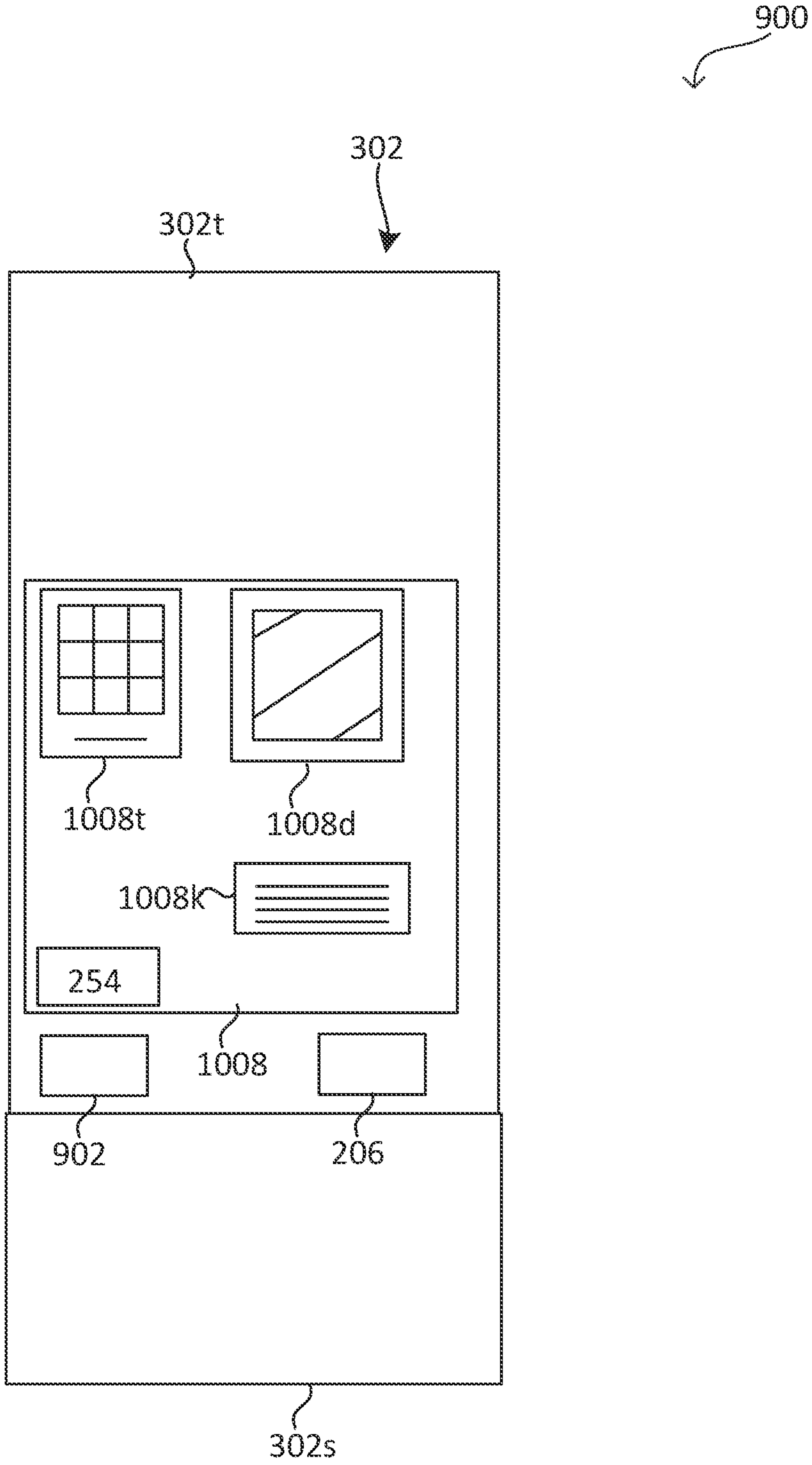
FIG. 9 is a schematic view, similar to FIG. 3, of a self-service terminal according to other further various aspects.

FIG. 9 illustrates a terminal 100 according to various aspects 900 in a schematic view, e.g., implementing an ATM or another type of banking terminal.

The terminal 100 may include the body 302, e.g., including a housing, a power plug, a stand **302*s* and the like. Certain (e.g., electronic) components of the terminal 100 may be hold by and/or attached to the body 302, for example, a cash exchange device 902 (if present), one or more interface devices of the UI 1008 and/or the IM-button 206. For example, the UI 1008 and/or the IM-button 206 may be hold by and/or attached to a tower 302*t* of the body 302**.

The UI 1008 may include at least one input device and/or at least one output device. The input device may be configured to receive a user input, e.g., one or more instructions of the user and/or one or more confirmations of the user. The output device may be configured to output a user perceptible information, e.g., acoustically and/or graphically (that is via audio and/or sound).

For example, the UI 1008 may include or be formed from a display device **1008*d* (e.g., including one or more screens) implementing the output device and optionally implementing the input device (e.g., via touch). For example, the user interface device 1008 may include a touch screen as input/output (I/O) device and/or one or more physical keys as input device, and/or a keyboard 1008*k* as input device. Optionally, the keyboard 1008*k* may be implemented by the touch screen of the display device 1008*d*. Alternatively or additionally, the UI 1008 may include the audio user interface 701, e.g., implemented by the connection device 254**.

The UI 1008 may optionally include the financial transaction device **1008*t***, that may be used for one or more financial transactions. The financial transaction may include a fund transfer (also referred to as monetary transfer), e.g., to the user as cash (also referred to as cash withdrawal), from the user as cash (also referred to as cash deposit) and/or between multiple accounts.

For example, the financial transaction device **1008*t*** may include a card reading device configured to receive a banking card and to read account information (information representing an account of the user) from the banking card, e.g., banking account information (information representing a banking account of the user). Additionally or alternatively, the card reading device may be configured to read banking account information wirelessly (e.g., via NFC), e.g., from a mobile device, the banking card or from other user equipment (e.g., from a mobile wallet of the mobile device).

The display device **1008*d* (e.g., its graphical user interface) may be configured to display information representing the financial transaction (also referred to as financial transaction information), e.g., being performed (e.g., initiated) by the user, for example, monetary transfer information (information representing the monetary transfer). The monetary transfer information may include a representation of a monetary amount transferred from the terminal to the user (e.g., by the cash withdrawal) or from the user to the terminal (e.g., by the cash deposit). The financial transaction information may include a representation of the financial transaction, e.g., an acknowledgement, the monetary transfer information, a request to input user credentials, and/or a request for a verification input. The monetary transfer may include the cash withdrawal from the exchange device 902 and/or the cash deposit at the exchange device 902**.

Generally, the exchange device 902 may be configured to pass cash between the user and the terminal 100, e.g., by transporting cash received from the user into the terminal 100 or transporting cash for the user out of the terminal 100. Exemplary components of the exchange device 902 may include: a cash exchange cavity, a cash exchange slot, a door to open and close the cavity, and the like.

The financial transaction device **1008*t*** may, for example, include at least one verification device configured to receive a verification input that associates the banking card with the user. Of course, other forms of cash transfer may be used additionally or alternatively to the banking card. Examples for a cash transfer form may include a debit card, a debit account, a credit card, a credit account, or cash.

Optionally, the financial transaction device **1008*t*** may, for example, include other components that enable to conduct the financial transaction, e.g., a secure data interface for transmitting secured data regarding the financial transaction. For example, the secure data interface may communicate with a banking server or another data storing entity of a financial institute.

Optionally, the financial transaction device **1008*t* may optionally include a printer of the UI 1008** to print a bill including a representation of the conducted financial transaction, e.g., details thereof and/or a summary thereof.

The terminal 100 may include a bank teller safe that is configured store cash (also referred to as cash storage), which may be received from the user or provided to the user depending on the direction of the monetary transfer. The bank teller safe may include a cavity for the cash storage (also referred to as cash storage cavity) and a transfer device configured to transfer cash from the exchange device 902 into the cash storage cavity and/or out of the cash storage cavity to the exchange device 902. Optionally, the bank teller safe may be configured to store one or more cash cassettes on the cash storage cavity. The bank teller safe (e.g., its transfer device) may include a communication device (also referred to as safe communication device) that is configured to communicate with the control device 106 and/or the one or more cash cassettes. The communication between the safe communication device and the control device 106 and/or the one or more cash cassettes may be secured, e.g., by one or more cryptographic process.

The control device 106 may be further configured to exchange the monetary transfer information and/or the account information with a banking server or another data storing entity of a financial institute, e.g., in order to allow the financial institute to record the monetary transfer at a banking account of the user.

The references made herein for cash, may analogously apply to any type of monetary document or monetary value.

It may be understood that the functionality of a self-checkout terminal and a banking terminal (e.g., an automated teller machine) may both be configured to perform a financial transaction. The self-checkout terminal may provide purchased items to the user in accordance with the financial transaction. The banking terminal may dispense or accept cash in accordance with the financial transaction. However, both, the functionality of a self-checkout terminal and a banking terminal, may be implemented, in some embodiments, by the same architecture of terminal 100 (e.g., configured for electronic funds transfer at point of sale) or by different architectures. In some embodiments, the functionality of the financial transaction may be implemented by XFS (extensions for financial services). XFS (e.g., configured as Middleware Software) provides a client-server architecture for financial applications on the Microsoft Windows platform, e.g., running on a terminal 100 configured for an electronic funds transfer at point of sale and/or configured as ATM.

A working example is explained in the following. A computer program (e.g., including a couple of small executable files) implementing the interface modification as outlined herein is added to the software of the terminal 100 executing the computer program. When the volume control button 206 (of the terminal 100) for the headset is pushed without the headset being plugged in, the computer program instructs the creation of an overlay (also referred to as overlay screen) on the display, e.g., set as foreground graphic. The overlay mirrors the actual application displayed at the display, but moves it to the bottom of the display (basically slides the top of the screen to the bottom of the screen) of the touchscreen. The actual application displayed at the display may include a dialogue representing the financial transaction. A virtual button (e.g., of the dialogue) implemented by the touchscreen proximate the top of the touchscreen is, by the overlay, mirrored to the bottom half of the touchscreen, making the virtual button more accessible. The originally displayed content of the application (e.g., the dialogue representing the financial transaction) is still present, but is in the background of the overlay and may be grayed out. For example, the original displayed content is still visible, but is shadowed. When the user touches the virtual button of the overlay (e.g., a "do a cash withdraw" button), both, the background of the overlay and the overlay, may display a replicate or a visible response to the touch at the virtual button of the overlay. The overlay (e.g., providing a mirrored screen) may transposing the virtual button pushes on itself to the correct location on the transaction screen in the background. For example, the actual application displayed at the display is bypassed (e.g., being not affected) by the overlay creation. The actual application may respond identically to the case without overlay, when the original virtual button is touched by the user, and the case with overlay, when the duplicate of the original virtual button provided by the overlay is touched by the user. Once the overlay is created, the overlay may persist for a predetermined time period (e.g., 5 seconds). After (see time out) the predetermined time period (e.g., after 5 seconds) the overlay may disappear (see reversal interface modification) and the actual application displayed at the display before the overlay was created is displayed again in the foreground. Additionally or alternatively, the user may push the volume control button again, to remove the overlay. In this case, the volume control button 206 functions as a toggle for the overlay to appear (also referred to as activate the overlay) or disappear, (also referred to as deactivate the overlay), see for example, the two-modification toggle outlined above. On a Vista operation system, the volume control button 206 may trigger an increase of the audio volume and activation/deactivation of the overlay, when a headset is plugged in.

In the following, various examples are provided with reference to the aspects described above.

Example 1 is a terminal (e.g., a self-service terminal), including: a user interface to provide information to a user of the terminal; an interface modification (e.g., reconfiguration) button; and a control device configured to: determine, whether an interface interaction mode of the terminal is a first interface interaction mode (e.g., a default mode) or a second interface interaction mode; instruct, in response to a user input at the interface modification button, a modification (e.g., reconfiguration) of: a first perceptible property assigned to the information, when the interface interaction mode is the first interface interaction mode, and a second perceptible property assigned to the information, when the interface interaction mode is the second interface interaction mode.

Example 2 is a terminal, including: a first (e.g., video) user interface device (e.g., being perceptible by a first perceptual sense); a second (e.g., audio) user interface (e.g., providing an audio signal) component; a control device configured to: determine, whether an interface interaction mode of the terminal is a first interface interaction mode or a second interface interaction mode (e.g., based on a usage status of the second user interface); instruct, in response to a user input at the interface modification button, a modification of the first user interface, when the interface interaction mode is the first interface interaction mode (e.g., being the case, when usage status of the second user interface is unused), and a modification of the second user interface, when the interface interaction mode is the second interface interaction mode (e.g., being the case, when usage status of the second user interface is used).

Example 3 is a terminal, including: a user interface to provide information (e.g., a request) to a user of the terminal; an interface modification button; a control device configured to: determine, whether an interface interaction mode of the terminal is a first interface interaction mode or a second interface interaction mode; change, in response to a user input at the interface modification button: a first parameter controlling a first perceptible property (e.g., being a function of the first parameter) of the information of the user interface, when the interface interaction mode is the first interface interaction mode, and a second parameter controlling a second perceptible property (e.g., being a function of the second parameter) of the information of the user interface, when the interface interaction mode is the first interface interaction mode.

Example 4 is a method, e.g., as performed by the control device of one of examples 1 to 3, the method comprising: providing an information to a user of a terminal by a user interface of the terminal; determining, whether an interface interaction mode of the terminal is a first interface interaction mode or a second interface interaction mode; instructing, in response to a user input at an interface modification button of the terminal, a modification of: a first perceptible property assigned to the information, when the interface interaction mode is the first interface interaction mode, and a second perceptible property assigned to the information, when the interface interaction mode is the second interface interaction mode.

Example 5 is a (e.g., non-volatile) computer-readable medium, including instructions (e.g. code segments representing the instructions), which, when executed by one or more processors, cause the processors to perform the method of example 4.

Example 6 is a computer program, including instructions (e.g. code segments representing the instructions), which, when executed by one or more processors, cause the processors to perform the method of example 4.

Example 7 is a controlling device, including one or more processors configured to perform the method of example 4, the controlling device optionally further configured in accordance with the control device of one of the examples 1 to 3.

In an exemplary configuration, the user input at the interface modification button may cause (e.g., trigger, induce, instruct) a quantitative change of the first perceptible property, when the interface interaction mode is the first interface interaction mode, and a quantitative change of the second perceptible property, when the interface interaction mode is the second interface interaction mode.

The quantitative change of the first perceptible property may include a quantitative change of the first parameter controlling the first perceptible property. Illustratively, the user input at the interface modification button may cause a quantitative variation of the first parameter (e.g., a spatial coordinate, a brightness, a contrast, etc.) from a value that the first parameter has prior to the user input at the interface modification button (and prior to the modification) to a different value (illustratively, after the instructing of the modification, e.g. responsive to the user input at the interface modification button). The quantitative change of the first parameter may correspond to a respective change of the first perceptible property. As a numerical example, the value of the first parameter after the modification may be at least 10% different from the value of the first parameter prior to the modification, e.g. at least 20% different, or at least 50% different.

In a corresponding manner, the quantitative change of the second perceptible property may include a quantitative change of the second parameter controlling the second perceptible property. Illustratively, the user input at the interface modification button may cause a quantitative variation of the second parameter (e.g., an audio volume) from a value that the second parameter has prior to the user input at the interface modification button to a different value. The quantitative change of the second parameter may correspond to a respective change of the second perceptible property. As a numerical example, the value of the second parameter after the modification may be at least 10% different from the value of the second parameter prior to the modification, e.g. at least 20% different, or at least 50% different.

Example 8 is one of examples 1 to 7, wherein the user interface of the terminal includes a first user interface device (e.g., configured to output the information, when the interface interaction mode of the terminal is a first interface interaction mode) and/or a second user interface device (e.g., configured to output the information, when the interface interaction mode of the terminal is a second interface interaction mode).

Example 9 is one of examples 1 to 8, wherein the interface modification button is a physical button and/or reachable by a sitting person and/or arranged less than 122 centimeter over ground. This facilitates the implementation, e.g., when the physical button is already pre-installed at the terminal.

Example 10 is one of examples 1 to 9, wherein the interface modification button is an audio control button or a button of a pin pad or keyboard of the UI. This facilitates the implementation, e.g., when the terminal lacks another appropriate pre-installed button.

Example 11 is one of examples 1 to 10, wherein the interface modification button is implemented as virtual button (e.g., by a screen of the UI) and/or reachable by a sitting person and/or arranged less than 122 centimeter over ground. This facilitates the implementation, e.g., when the terminal lacks an appropriate physical pre-installed button.

Example 12 is one of examples 1 to 11, wherein the interface modification button is disposed lower than a screen of the user interface (e.g., below the screen) and/or below the first user interface device.

Example 13 is one of examples 1 to 12, wherein the first perceptual property is perceptible by a first perceptual (human) sense, and the second perceptual property is perceptible by a second perceptual (human) sense, e.g., being different from the first perceptual (human) sense, Example 14 is one of examples 1 to 13, wherein the first interface interaction mode is a default mode and/or a video interaction mode (e.g., vision-based interaction mode).

Example 15 is one of examples 1 to 14, wherein the second interface interaction mode is a non-default mode and/or a non-video interaction mode (e.g., a non-vision-based interaction mode), e.g., an audio interaction mode (e.g., voice interaction mode), e.g., an only-audio interaction mode.

Example 16 is one of examples 1 to 15, wherein the second perceptible property differs from the first perceptible property and/or includes (e.g., is) an audio volume of the information and/or (e.g., when) the information is provided by an audio user interaction device (also referred to as audio device) of the UI (e.g., by an audio jack thereof), wherein preferably, the information is provided by the audio user interaction device, when the interface interaction mode of the terminal is the second interface interaction mode.

Example 17 is one of examples 1 to 16, wherein the first perceptible property includes a graphical position and/or graphical geometry (e.g., size and/or shape) of the information and/or (e.g., when) the information is provided (e.g., presented, e.g., displayed) by a video user interaction device (also referred to as video device) of the UI (e.g., by one or more display devices thereof), wherein preferably, the information is provided by the video user interaction device, when the interface interaction mode of the terminal is the first interface interaction mode.

Example 18 is one of examples 1 to 17, wherein the terminal is a self-service terminal, e.g., an automated teller machine, a self-checkout terminal, or a vending machine.

Example 19 is one of examples 1 to 18, wherein the modification includes a modification of a first parameter controlling (e.g., influencing) the first perceptible property, when the interface interaction mode is the first interface interaction mode.

Example 20 is one of examples 1 to 19, wherein the modification includes a modification of a second parameter controlling (e.g., influencing) the second perceptible property, when the interface interaction mode is the second interface interaction mode.

Example 21 is one of examples 1 to 20, wherein the information is invariant to the modification (e.g., of the first perceptible property and/or of the second perceptible property).

Example 22 is one of examples 1 to 21, wherein the modification of the first perceptible property is in accordance with a stored parameter, which is optionally programmable (e.g., in a service mode of the terminal), wherein, preferably, the modification of the first perceptible property changes a value of the first perceptible property (e.g., a positional coordinate) to the stored parameter.

Example 23 is one of examples 1 to 22, wherein the information is output (e.g., presented) by a first user interface device of the user interface, when the interface interaction mode is the first interface interaction mode; and/or wherein the information is output (e.g., presented) by a second user interface device of the user interface, when the interface interaction mode is the second interface interaction mode; wherein, preferably, the first user interface device is disposed higher than the second user interface device (e.g., over ground) or at least distant from the second user interface device.

Example 24 is one of examples 1 to 23, wherein the information includes (or is) an input request and/or is addressed to the user.

Example 25 is one of examples 1 to 24, wherein the information includes (or is) an option for operating (e.g., controlling) the terminal (also referred to as operation option), e.g., an input option.

Example 26 is one of examples 1 to 25, wherein the user interface is accessible (e.g., at least partially perceptible) by a user of the terminal.

Example 27 is one of examples 1 to 26, wherein the second user interface device is a physical interface and/or reachable by a sitting person and/or arranged less than 122 centimeter over ground.

Example 28 is one of examples 1 to 27, wherein the first user interface device and the second user interface device differ from each other in: a spatial position (e.g., by rearrangement, e.g., repositioning, of the information), a type of perception of a user of the terminal, via which the respective user interface is accessible.

Example 29 is one of examples 1 to 28, wherein the first perceptible property and the second perceptible property differ from each other, e.g., in the perceptual sense to which they are perceptible.

Example 30 is one of examples 1 to 29, wherein the first perceptible property is a video property (e.g., graphical and/or spatial position) of the information; and/or wherein the first (e.g., video) user interface device is a video (e.g., graphical) user interface device (e.g., including one or more screens, e.g., touch screens).

Example 31 is one of examples 1 to 30, wherein the modification of the first perceptible property is instructed to an Application Programming Interface (API), e.g., of an operating system executed by the terminal and/or running an application outputting the information. The Application Programming Interface facilitates the implementation and may be a magnification API, which facilitates the implementation even more.

Example 32 is one of examples 1 to 31, wherein the modification of the first perceptible property comprises a rearrangement (e.g., repositioning) of a graphical output (e.g., representing the information), e.g., the graphical output including of one or more graphical (e.g., input) operation elements (e.g., each of which representing an operation option), e.g., soft keys.

Example 33 is one of examples 1 to 32, wherein the modification includes a first (e.g., graphical interface) modification of the user interface in response to the user input at the interface modification button, and, preferably, the modification includes to reverse the first modification of the user interface in response to a further (e.g., subsequent) user input at the interface modification button.

Example 34 is one of examples 1 to 33, wherein the modification of the first perceptible property comprises mirroring a (e.g., at least one operation element of a) graphical output (e.g., representing the information) of the (e.g., graphical) user interface, e.g., the graphical output including of one or more graphical (e.g., input) operation elements (e.g., each of which representing an operation option as information), e.g., soft keys.

Example 35 is example 34, wherein mirroring the graphical output comprises to overlay the graphical output with a (e.g., resized and/or rearranged, e.g., repositioned) duplication of (e.g., at least a part) of the graphical output, e.g., its operation element (e.g., a soft key).

Example 36 is one of examples 1 to 35, wherein the second perceptible property is an audio property (e.g., audio volume) of the information; and/or wherein the first (e.g., audio) user interface device is an audio user interface device (e.g., including a connection device).

Example 37 is one of examples 1 to 36, wherein the information is related to a self-service session (herein also referred to as self-service session related information) provided by the terminal, or at least addressing the user (herein also referred to as user-addressing information).

Example 38 is one of examples 1 to 37, wherein the information is related to an output of an application executed by the terminal.

Example 39 is one of examples 1 to 38, the terminal (e.g., its second user interface device) further comprising a (e.g., audio) connection device (e.g., an audio jack), wherein, preferably, the determination, whether the interface interaction mode of the terminal is the first interface interaction mode or the second interface interaction mode, is based on a usage status (e.g., a connection status) of the connection device.

Example 40 is example 39, wherein the second interface interaction mode is determined as interface interaction mode, when (e.g., in response to): the connection device is (e.g., wired or non-wired) coupled to a further (e.g., portable) connection device (e.g., being user equipment) and/or a usage of the connection device by the user started, and preferably, otherwise the first interface interaction mode is determined as interface interaction mode.

Example 41 is example 39 or 40, wherein the first interface interaction mode is determined as interface interaction mode, when (e.g., in response to): the connection device is decoupled from the further (e.g., portable) connection device (e.g., being user equipment) and/or the usage of the connection device by the user ended (e.g., indicated by decoupling the further connection device).

Example 42 is one of examples 39 to 41, wherein the user interface is configured to implement an audio user interface by the connection device, e.g., a voice-based user interface.

Example 43 is one of examples 39 to 42, wherein the connection device is configured to exchange an audio signal with the further connection device, when being (e.g., wired or non-wired) coupled to each other.

Example 44 is one of examples 1 to 43, further including (e.g., the control device being configured for): determining the first interface interaction mode as interface interaction mode, in response to the usage of the connection device ended, e.g., indicated by a further (e.g., portable) connection device (e.g., being user equipment) being decoupled (e.g., disconnected) from the terminal (e.g., its connection device).

Example 45 is one of examples 1 to 44, further including (e.g., the control device being configured for): changing the interface interaction mode (e.g., to the second interface interaction mode), which preferably includes an activation of an audio user interface device of the user interface, and/or a deactivation of a video (e.g., graphical) user interface device of the user interface.

Example 46 is one of examples 1 to 45, wherein the first perceptible property includes one or more of the following: graphic contrast; graphic brightness; graphic position (e.g., height), graphic geometry (e.g., size and/or shape); font type, wherein preferably, the modification of the first perceptible property is free of a graphic compression.

Example 47 is one of examples 1 to 46, wherein the modification of the first perceptible property is implemented by one or more of the following (e.g., processing the information, e.g., a data representation thereof): a graphic magnifier (e.g., a magnification API), a firmware of (e.g., a display device of) the user interface (e.g., presenting the information), or a separate application converting the graphical output (e.g., soft keys) of the user interface; and/or a device (e.g., graphic card) driver.

Example 48 is one of examples 1 to 47, wherein the information represents a request to the user, e.g., to input user credentials, a user authorization and/or a user authentication.

Example 49 is one of examples 1 to 48, wherein the modification of the first perceptible property is independent from an application layer (e.g., executed by the terminal) providing the information.

Example 50 is one of examples 1 to 49, further including (e.g., the control device being configured for): performing (e.g., initiating, conducting, or ending) a financial transaction based on an input at the user interface, wherein, preferably, the financial transaction may include a request to the user represented by the information.

Example 51 is one of examples 1 to 50, the terminal further including a product scanning device configured to scan a product identifier of a product presented to the product sensing device (wherein the information may optionally represent a request to the user the scan the product identifier); wherein the terminal (e.g., its control device) is configured to initiate the financial transaction further based on the product identifier.

Example 52 is one of examples 1 to 51, further including (e.g., the control device being configured for): generating a message according to a network communication protocol, the message (e.g., addressed to a financial institution server) including a request for a verification of an input of user credentials at the user interface (e.g., as requested by the information); and to initiate the financial transaction further based on a response to the message.

Example 53 is one of examples 1 to 52, the terminal further including: a bank teller safe, wherein the financial transaction is configured to transfer one or more monetary documents to or from the bank teller safe.

Example 54 is one of examples 1 to 53, the terminal further including: a network transceiver, wherein the control device is configured to request and/or update (e.g., according to a network protocol) one or more parameters of the modification (e.g., of the first perceptible property and/or of the second perceptible property).

Example 55 is one of examples 1 to 54, the terminal further including: a memory storing one or more parameters of the modification (e.g., of the first perceptible property and/or of the second perceptible property).

Example 56 is one of examples 1 to 55, further including (e.g., the control device being configured for): instructing to reverse the modification of the first perceptible property (preferably when the interface interaction mode is the first interface interaction mode), in response to one or more of the following: a user (e.g., touch) input at the user interface; a time stamp of the modification of the of the first perceptible property fulfilling a predefined (e.g., stored) criterion; a further user input at the interface modification button (e.g., implementing a two-modification toggle), wherein the criterion is optionally fulfilled, when a chronological difference from the time stamp exceeds a predefined (e.g., stored) value.

Example 57 is example 56, further including (e.g., the control device being configured for): outputting a chronological information (e.g., a timer counter) via the user interface based on the time stamp of the modification of the user interface.

Example 58 is one of examples 1 to 57, wherein the further connection device (e.g., being user equipment) is configured to convert an (e.g., electrical) output of the user interface into an output (e.g., having the second perceptible property) perceptible by the user and/or including the information.

Example 59 is one of examples 1 to 58, wherein the further connection device includes a loudspeaker (also referred to as speaker).

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

While principles and modes of operation have been explained and illustrated with regard to particular embodiments, it must be understood, however, that this may be practiced otherwise than as specifically explained and illustrated without departing from its spirit or scope

What is claimed is:

1. A self-service terminal, comprising:

a body with a stand and a tower positioned on the stand;

a user interface to provide information to a user of the self-service terminal;

an interface modification button spaced from the user interface;

a control device configured to:

determine, whether an interface interaction mode of the self-service terminal is a first interface interaction mode or a second interface interaction mode; and instruct, in response to a user input at the interface modification button, a modification of:

a first perceptible property assigned to the information, when the interface interaction mode is the first interface interaction mode, and a second perceptible property assigned to the information, when the interface interaction mode is the second interface interaction mode, wherein the second perceptible property is further defined as a position of the information on the user interface and the modification is further defined as not a change in the content of the information displayed on the user interface but a change in the position of the information on the user interface;

wherein the interface modification button and the user interface are held by the tower; and wherein the modification of the second perceptible property is further defined as displayed on the user interface and comprises mirroring at least one operation element of a graphical output on the user interface that was displayed on the user interface prior to the modification, which represents the information, wherein mirroring comprises to overlay the graphical output with a rearranged duplication of the at least one operation element.

2. The self-service terminal of claim 1, wherein the first perceptible property and the second perceptible property differ from each other in the perceptual sense, to which they are perceptible.

3. The self-service terminal of claim 1, wherein the first perceptible property is a video property specifically a graphical position.

4. The self-service terminal of claim 1, wherein the control device is configured to instruct the modification of the first perceptible property to an Application Programming Interface (API) of the self-service terminal.

5. The self-service terminal of claim 1, which is configured as an automated teller machine (ATM).

6. The self-service terminal of claim 1, wherein the first perceptible property is an audio property specifically an audio volume.

7. The self-service terminal of claim 1, further comprising a connection device, wherein the control device is configured to determine the second interface interaction mode as interface interaction mode, in response to the connection device being in usage by the user, and otherwise, determine the first interface interaction mode as interface interaction mode;

wherein the user interface is configured to implement an audio user interface by the connection device.

8. The self-service terminal of claim 7, wherein the connection device is configured to exchange an audio signal with a further connection device, when being coupled to each other; and/or wherein the control device is further configured to determine the first interface interaction mode as interface interaction mode, in response to the usage of the connection device ended.

9. The self-service terminal of claim 1, wherein the control device is further configured to initiate a financial transaction based on an input at the user interface, which is requested by the information.

10. The self-service terminal of claim 1, wherein the control device is further configured when the interface interaction mode is the first interface interaction mode, to instruct a reversal of the modification of the first perceptible property, in response to:

a user touch input at the user interface;

when a time stamp of the modification of the of the first perceptible property fulfills a predefined criterion;

in response to a further user input at the interface modification button.

11. The self-service terminal of claim 1, wherein the modification comprises a modification of a first parameter controlling the first perceptible property, when the interface interaction mode is the first interface interaction mode.

12. The self-service terminal of claim 1, wherein the modification comprises a modification of a second parameter controlling the second perceptible property, when the interface interaction mode is the second interface interaction mode.

13. The self-service terminal of claim 12, wherein the modification of the first parameter induces a change from a value of the first perceptible property prior to the user input at the interface modification button to a different value of the first perceptible property; and/or wherein the modification of the second parameter induces a change from a value of the second perceptible property prior to the user input at the interface modification button to a different value of the second perceptible property.

14. The self-service terminal of claim 1, wherein the information is invariant to the modification of the first perceptible property and/or of the second perceptible property.

15. The self-service terminal of claim 1, wherein the modification of the first perceptible property is in accordance with a stored parameter, and wherein, the modification of the first perceptible property changes a value of the first perceptible property to the stored parameter.

16. The self-service terminal of claim 1 wherein the mirroring is further defined as comprising to overlay the graphical output with the rearranged duplication and an enlargement of the at least one operation element.

17. The self-service terminal of claim 16 wherein the mirroring is further defined as comprising to overlay the graphical output with the rearranged duplication and the enlargement of the at least one operation element while also displaying the graphical output as was displayed on the user interface prior to the modification.

* * * * *